United States Patent
Karras et al.

(10) Patent No.: US 9,569,559 B2
(45) Date of Patent: Feb. 14, 2017

(54) BEAM TRACING

(71) Applicant: NVIDIA Corporation, Santa Clara, CA (US)

(72) Inventors: Tero Tapani Karras, Helsinki (FI); Timo Oskari Aila, Tuusula (FI); Samuli Matias Laine, Vantaa (FI); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2 days.

(21) Appl. No.: 14/662,090

(22) Filed: Mar. 18, 2015

(65) Prior Publication Data

US 2016/0071310 A1    Mar. 10, 2016

Related U.S. Application Data

(60) Provisional application No. 62/046,093, filed on Sep. 4, 2014.

(51) Int. Cl.
*G06T 15/60* (2006.01)
*G06F 17/30* (2006.01)
(Continued)

(52) U.S. Cl.
CPC ... *G06F 17/30961* (2013.01); *G06F 17/30327* (2013.01); *G06F 17/30563* (2013.01);
(Continued)

(58) Field of Classification Search
USPC .................................................. 345/419, 426
See application file for complete search history.

(56) References Cited

U.S. PATENT DOCUMENTS

| | | | | |
|---|---|---|---|---|
| 6,097,394 A | * | 8/2000 | Levoy | G02B 27/2271 345/419 |
| 8,638,331 B1 | * | 1/2014 | Jarosz | G06T 15/06 345/426 |

(Continued)

OTHER PUBLICATIONS

Barringer, R. et al., "Dynamic Stackless Binary Tree Traversal," Journal of Computer Graphics Techniques, vol. 2, No. 1, 2013, pp. 38-49.

(Continued)

*Primary Examiner* — Kimbinh T Nguyen
(74) *Attorney, Agent, or Firm* — Zilka-Kotab, PC

(57) ABSTRACT

An apparatus, computer readable medium, and method are disclosed for performing an intersection query between a query beam and a target bounding volume. The target bounding volume may comprise an axis-aligned bounding box (AABB) associated with a bounding volume hierarchy (BVH) tree. An intersection query comprising beam information associated with the query beam and slab boundary information for a first dimension of a target bounding volume is received. Intersection parameter values are calculated for the first dimension based on the beam information and the slab boundary information and a slab intersection case is determined for the first dimension based on the beam information. A parametric variable range for the first dimension is assigned based on the slab intersection case and the intersection parameter values and it is determined whether the query beam intersects the target bounding volume based on at least the parametric variable range for the first dimension.

16 Claims, 20 Drawing Sheets

(51) Int. Cl.
  *G06T 15/00* (2011.01)
  *G06T 15/06* (2011.01)
  *G06T 15/80* (2011.01)
  *G06T 15/08* (2011.01)
  *G06T 15/10* (2011.01)
  *H04N 19/174* (2014.01)
  *H04N 19/44* (2014.01)
  *G06T 1/60* (2006.01)
  *G06T 17/10* (2006.01)

(52) U.S. Cl.
  CPC .............. *G06T 1/60* (2013.01); *G06T 15/005* (2013.01); *G06T 15/06* (2013.01); *G06T 15/08* (2013.01); *G06T 15/10* (2013.01); *G06T 15/80* (2013.01); *G06T 17/10* (2013.01); *H04N 19/174* (2014.11); *H04N 19/44* (2014.11)

(56) References Cited

U.S. PATENT DOCUMENTS 8,797,324 B2 * 8/2014 Mora ..................... G06T 15/06
                                              345/420

9,013,484 B1 * 4/2015 Jakob ..................... G06T 15/06
                                              345/419

OTHER PUBLICATIONS

Foley, T. et al., "KD-Tree Acceleration Structures for a GPU Raytracer," Graphics Hardware, The Eurographics Association, 2005, pp. 1-8.

Horn et al., "Interactive k-D Tree GPU Raytracing," ACM, Proceedings of the 2007 Symposium on Interactive 3D Graphics and Games, 2007, pp. 1-8.

Kalojanov, J. et al., "Two-Level Grids for Ray Tracing on GPUs," Eurographics, vol. 30, No. 2, 2011, pp. 1-8.

Laine, S., "Restart Trail for Stackless BVH Traversal," High Performance Graphics, The Eurographics Association, 2010, pp. 1-5.

Makinen, E., "A Survey on Binary Tree Codings," The Computer Journal, vol. 34, No. 5, 1991, pp. 438-443.

Parker, S. G. et al., "OptiX: A General Purpose Ray Tracing Engine," ACM Transactions on Graphics, 2010, pp. 1-13.

Wachter, C. et al., "Instant Ray Tracing: The Bounding Interval Hierarchy," Eurographics Symposium on Rendering, The Eurographics Association, 2006, pp. 1-11.

* cited by examiner

| Query Type | q.oA | q.dA | q.oB | q.dB | Implied Terms |
|---|---|---|---|---|---|
| TTUQ_RAY | Y | Y | no | no | |
| TTUQ_BEAM | Y | Y | Y | Y | |
| TTUQ_BEAM_FRUSTUM | Y | Y | no | Y | q.oB = q.oA |
| TTUQ_BEAM_SWEEP | Y | Y | Y | no | q.dB = q.dA |
| TTUQ_BEAM_AABB | Y | Y | no | no | q.oB = q.oA, q.dB = -q.dA |
| TTUQ_BEAM_RAY | Y | Y | no | no | q.oB = q.oA, q.dB = q.dA | ns # BEAM TRACING

CLAIM OF PRIORITY

This application claims the benefit of U.S. Provisional Application No. 62/046,093 titled "Bounding Volume Hierarchy Representation and Traversal," filed Sep. 4, 2014, the entire contents of which is incorporated herein by reference.

FIELD OF THE INVENTION

The present invention relates to data structure queries, and more particularly to beam tracing in bounding volume hierarchy data structures.

BACKGROUND

Computer graphics uses a variety of methods to generate two-dimensional representations of a three-dimensional scene. For example, a three-dimensional scene represented as a plurality of geometric primitives (e.g., points, lines, triangles, quads, meshes, etc.) may be rasterized to project the geometric primitives to a projection plane and then shaded to calculate a color for one or more pixels of the projection plane based on the rasterization. Alternatively, another technique for generating two-dimensional representations of the three-dimensional scenes is to perform ray-tracing. As is known in the art, ray-tracing is a technique that includes the operation of sending out rays from a particular viewpoint and intersecting the rays with the geometry of the scene. When an intersection is detected, lighting and shading operations may be performed to generate a color value for a pixel of the projection plane intersected by the ray. Additionally, other rays may be generated based on the intersected primitives that contribute to the color of the intersected pixel or other pixels.

Because the number of geometric primitives in a scene may be quite large (e.g., on the order of millions of triangles, etc.) and the number of rays generated to test for intersection against the primitives is also quite large (e.g., on the order of millions to billions of rays), intersection test efficiency typically defines overall rendering efficiency. Each test is typically performed as a query between a test object, such as a ray or a beam, and a target object, such as a triangle.

In massively parallel architectures, query efficiency can substantially determine overall system performance and inefficient query techniques may lead directly to degraded performance. Thus, there is a need for addressing these issues and/or other issues associated with the prior art.

SUMMARY

An apparatus, computer readable medium, and method are disclosed for performing an intersection query between a query beam and a target bounding volume. An intersection query comprising beam information associated with the query beam and slab boundary information for a first dimension of a target bounding volume is received. Intersection parameter values are calculated for the first dimension based on the beam information and the slab boundary information and a slab intersection case is determined for the first dimension based on the beam information. A parametric variable range for the first dimension is assigned based on the slab intersection case and the intersection parameter values and it is determined whether the query beam intersects the target bounding volume based on at least the parametric variable range for the first dimension.

The apparatus may comprise circuitry within a processing unit, such as a parallel processing unit, which may further include circuitry to implement one or more tree traversal units that may be configured to generate the intersection query. Other embodiments include software, hardware, and systems configured to perform method steps for performing the intersection query.

DETAILED DESCRIPTION

Rendering techniques based on ray tracing may organize three-dimensional (3D) objects, such as triangles, occupying a 3D space using a bounding volume hierarchy (BVH), a data structure designed to efficiently encode spatial relationships among 3D objects. Each 3D object within the BVH may be represented as a bounding volume, such as an axis-aligned bounding box (AABB), defined by a pair of bounding planes in each of three dimensions. Rendering a two-dimensional image that depicts a particular scene defined by the 3D objects and a particular view point involves ray-tracing each sample (e.g. pixel or sub-pixel) of an image plane associated with the view point and testing whether a given ray intersects with one or more of the bounding volumes corresponding to the 3D objects. An intersection with a bounding volume indicates there may be a true intersection with an associated 3D object, and additional intersection analysis may be needed to establish a true intersection. A non-intersection with a bounding volume definitively indicates there is no intersection with an associated 3D object. A positive test for an intersection between a ray and a bounding volume indicates that there may be a true intersection, the determination of which is beyond the scope of the present disclosure, but may be accomplished using any technically feasible technique.

Testing for an intersection between a ray and a target bounding volume may be performed using a Cartesian coordinate system, whereby the ray is specified as a set of coordinate values and bounding planes of the bounding volume are also specified as a set of coordinate values, providing a consistent comparison space over all three dimensions in a 3D space. Testing may be performed as a query, where a given query ray is tested against bounding volumes within the BVH. An individual query may comprise testing whether the parametric variable associated with the query ray is within an appropriate range to fall between bounding planes for the x-dimension, y-dimension, and z-dimension to intersect the bounding volume.

A beam intersection test is particularly useful in ray-tracing and essentially tests whether a first bounding volume intersects a second bounding volume. A beam may be used as a conservative bounding volume for an arbitrary set of rays, so that if any of the individual rays intersect a given 3D object, the beam is also guaranteed to intersect the 3D object. The specification of the beam may comprise two rays, and each of the two rays may be specified to have an origin and a direction. As with testing a query ray for intersections, the query beam may be tested for intersections against bounding volumes within the BVH. A technique for performing an individual query of a query beam against a target bounding volume is discussed below.

Figure 1A:
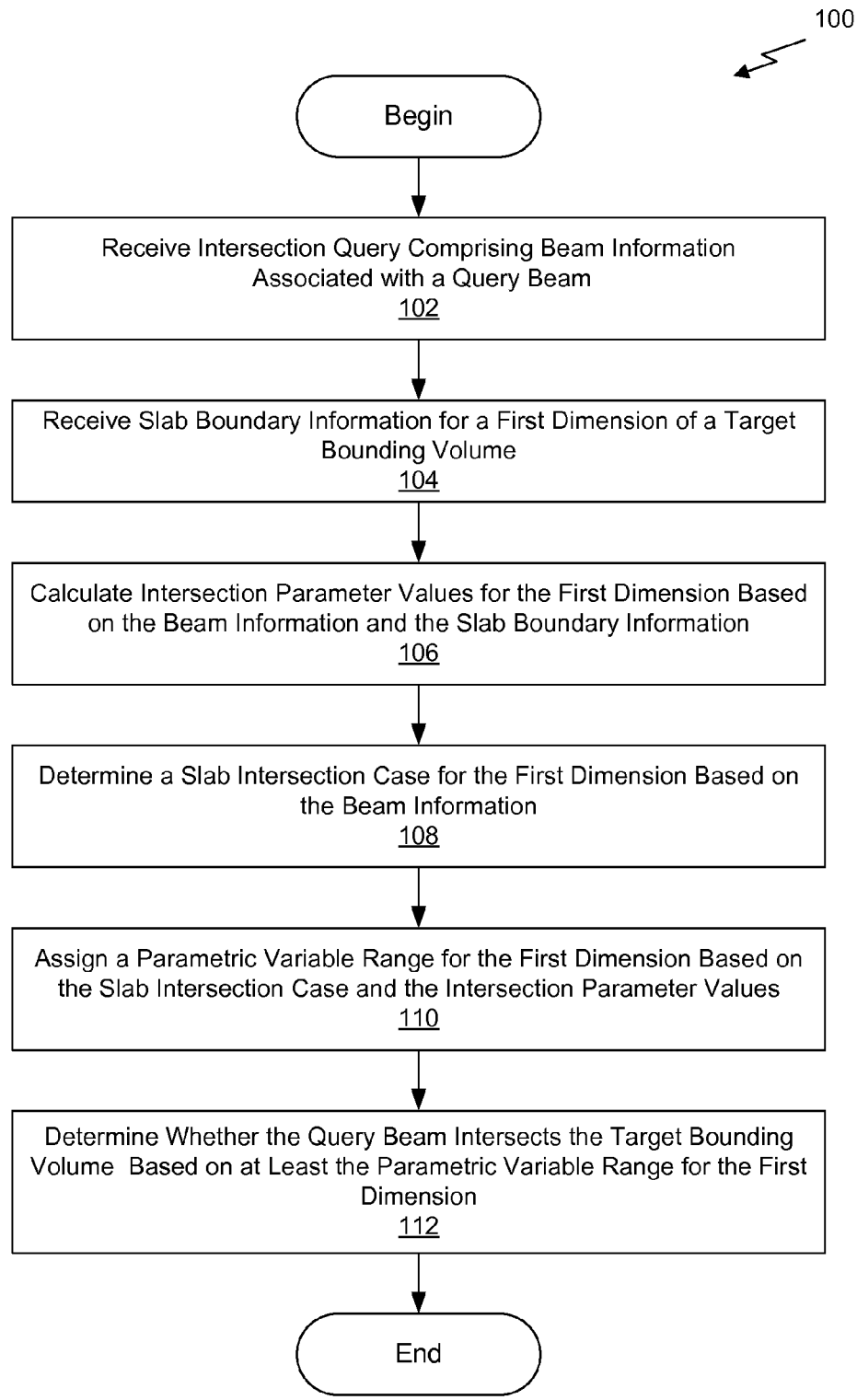
FIG. 1A illustrates a flowchart of a method for determining whether a query beam intersects a target bounding volume, in accordance with one embodiment.

FIG. 1A illustrates a flowchart of a method 100 for determining whether a query beam intersects a target bounding volume, in accordance with one embodiment. Although the method 100 is described in conjunction with the systems of FIGS. 2-5B and 9, persons of ordinary skill in the art will understand that any system that performs method 100 is within the scope of embodiments of the present invention. In one embodiment, an intersection test engine is configured to perform method 100. The intersection test engine may reside within tree traversal unit (TTU) 500 of FIGS. 5A-5B, or within any other technically feasible location within the parallel processing unit (PPU) 200 of FIG. 2. In other embodiments, the intersection test engine may reside within any technically feasible location within a computer system architecture. The intersection test engine may be implemented using customized logic circuitry, such as a customized processing pipeline. Alternatively, the intersection test engine may be implemented as instructions or microcode for controlling a processing unit.

Method 100 begins at step 102, where the intersection test engine receives an intersection query comprising beam information associated with a query beam q. In one embodiment, the query beam comprises a first query ray and a second query ray, and the beam information comprises a first query origin (q.oA) and a first query direction (q.dA) associated with the first query ray, and a second query origin (q.oB) and a second query direction (q.dB) associated with the second query ray. Each query origin and each query direction may include a component in x, a component in y, and a component in z. For example, the first query origin q.oA may include a component in x (q.oA.x), a component in y (q.oA.y), and a component in z (q.oA.z); and the second query origin q.oB may include a component in x (q.oB.x), a component in y (q.oB.y), and a component in z (q.oB.z).

In one embodiment, the beam information comprises a first AABB (AABB0) and a second AABB (AABB1), where AABB0 is associated with a particular value (e.g. 0.0) for a parametric variable and AABB1 is associated with another value (e.g. 1.0) for the parametric variable. Each AABB may be described according to x, y, and z coordinates at two diagonally opposite corners, and a minimum and maximum coordinate may be determined for each dimension within a 3D space. For example, a maximum x coordinate (aabb0.xmax) may represent a maximum x coordinate for all corners associated with AABB0. Similarly, AABB0 may include a maximum y coordinate (aabb0.ymax), a maximum z coordinate (aabb0.zmax), a minimum x coordinate (aabb0.xmin), a minimum y coordinate (aabb0.ymin), and a minimum z coordinate (aabb0.zmin). AABB1 may similarly include minimum and maximum values for each dimension.

Furthermore, the first query origin (q.oA) may correspond to a maximum corner of AABB0 (q.oA.x=aabb0.xmax; q.oA.y=aabb0.ymax; q.oA.z=aabb0.zmax) and the second query origin (q.oB) may correspond to a minimum corner of AABB0 (q.oB.x=aabb0.xmin; q.oB.y=aabb0.ymin; q.oB.z=aabb0.zmin). Similarly, a direction for each query ray (q.dA and q.dB) may be determined as well as an inverse direction for each query ray (q.idA and q.idB) based on corresponding corners of AABB0 and AABB1. An inverse direction may be calculated as a reciprocal for each dimension (e.g. component) of a direction. A direction of zero may be treated as a special case and assigned an inverse direction of infinity. At this point, the first query ray and the second query ray associated with the query beam are specified according to the parametric variable.

The beam information may also include a parametric variable range comprising a minimum value (q.tmin) and a maximum value (q.tmax). The minimum and maximum values may be useful for defining the extent of the beam so that it may not necessarily extend all the way to AABB0 (q.tmin>0), or that it may extend beyond AABB1 (q.tmax>1), or not all the way to AABB1 (q.tmax<1).

In one embodiment, certain beam configuration requirements may be satisfied in conjunction with execution of method 100, wherein a given beam configuration is considered valid if the beam configuration requirements are satisfied. The beam configuration requirements may include, without limitation, q.tmin≥0, q.tmax≥q.tmin, q.oA.x≥q.oB.x, q.dA.x≥q.dB.x, and so on. In such an embodiment, executing method 100 in accordance with the beam configuration requirements may provide certain practical benefits, such as reduced latency, power, and/or area.

At step 104, the intersection test engine receives slab boundary information for a first dimension (e.g. an x dimension) of a target bounding volume. In one embodiment, the target bounding volume may comprise an AABB stored within a BVH, and the slab boundary information comprises a minimum position of the target bounding volume along the first dimension (aabb.xmin) and a maximum position of the target bounding volume along the first dimension (aabb.xmax).

In certain embodiments, the slab boundary information further comprises a minimum position of the target bounding volume along a second dimension (aabb.xmin) and a maximum position of the target bounding volume along the second dimension (aabb.ymax). The slab boundary information may further comprise a minimum position of the target bounding volume along a third dimension (aabb.zmin) and a maximum position of the target bounding volume along the third dimension (aabb.zmax).

At step 106, the intersection test engine calculates intersection parameter values for the first dimension based on the beam information and the slab boundary information. The value of an individual intersection parameter value may be calculated according to an intersection between a query ray and the target bounding volume within an associated dimension. For example, an intersection by the first query ray at a minimum value along the first dimension is referred to herein as intersection parameter value Amin. Similarly, an intersection at a maximum value is referred to herein as intersection parameter value Amax. Minimum and maximum intersection parameter values associated with the second query ray are referred to herein as Bmin and Bmax, respectively. In one embodiment, the intersection parameter values include one or more of Amin, Amax, Bmin, and Bmax. In one embodiment, the intersection test engine further calculates intersection parameter values for each dimension within a 3D space. For example, the intersection parameter values may include a minimum and maximum value for each of x, y, and z dimensions.

At step 108, the intersection test engine determines a slab intersection case for the first dimension based on the beam information and the intersection parameter values. In one embodiment, determining the slab intersection case comprises comparing the direction of the first query ray in the first dimension to zero and comparing the direction of the second query ray in the first dimension to zero. Each comparison may yield a greater than, less than, or equal to relationship. In one embodiment, the intersection engine further determines a slab intersection case for the second dimension and a slab intersection case for the third dimension. In such an embodiment, each dimension of a 3D space may have an independent and distinct intersection case.

At step 110, the intersection test engine assigns a parametric variable range for the first dimension based on the slab intersection case. In one embodiment, the parametric variable range for the first dimension comprises a minimum value parametric variable (x.tmin) and a maximum value parametric variable (x.tmax). The parametric variable range may be assigned according to at least one intersection parameter value. In one embodiment, the intersection engine further assigns a parametric variable range for the second dimension and a parametric variable range for the third dimension. In such an embodiment, each dimension of a 3D space may have an independent and distinct parametric variable range.

At step 112, the intersection test engine determines whether the query beam intersects the target bounding volume based on at least the parametric variable range for the first dimension. In one embodiment, for an intersection to occur between a query beam and a target bounding volume, there must be at least one value of the parametric variable for which the beam and the target bounding volume overlap in each of the dimensions of the 3D space. In other words, there must be at least one t-value within the parametric variable range of the beam (q.tmin, q.tmax) that is included in the parametric variable ranges associated with each of the dimensions (e.g., x.tmin, x.tmax). Such t-values can be found by taking the max-of-mins and min-of-maxes, as illustrated below in Table 1. Upon completing step 112, method 100 terminates. While the method 100 is described in the context of an inverse direction, the method 100 may also be implemented using any direction representation, including a direct representation and an inverse direction representation. Any representation of direction, including inverse direction, may be referred to herein generically as a direction vector, whereby the direction vector may include one or more values.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
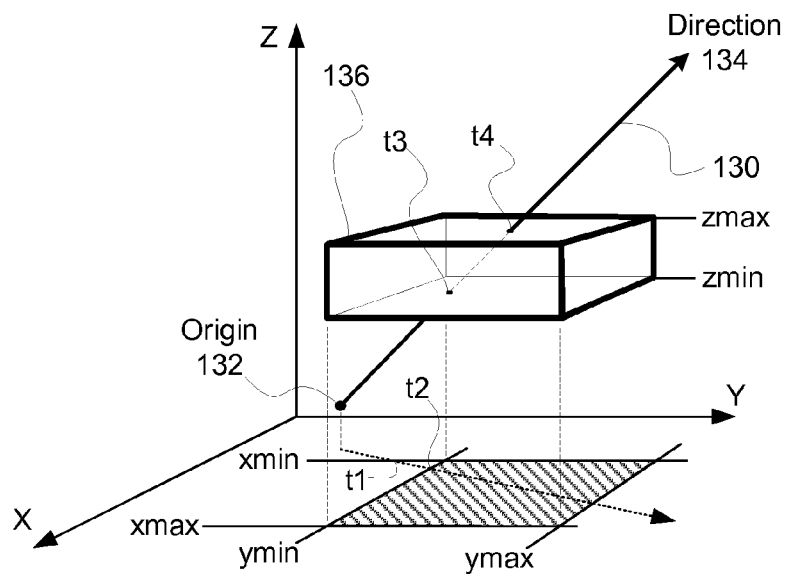
FIG. 1B illustrates a ray intersecting a rectangular bounding volume, in accordance with one embodiment.

FIG. 1B illustrates a ray 130 intersecting a rectangular bounding volume 136, in accordance with one embodiment. As shown, the ray 130 includes an origin 132 and a direction 134. The path of the ray 130 is a function of a parametric variable (t), such that t=0 at the origin 132, and t=1 at a maximum search extent along the ray 130. In one embodiment, parametric variable t represents time.

The rectangular bounding volume 136 is defined by a pair of infinite planes at minimum and maximum values in each dimension. In the x dimension, the rectangular bounding volume 136 is defined by a minimum value (xmin) and a maximum value (xmax) of x. In the y dimension, the rectangular bounding volume 136 is defined by a minimum value (ymin) and a maximum value (ymax) of y. In the z dimension, the rectangular bounding volume 136 is defined by a minimum value (zmin) and a maximum value (zmax) of z.

Each pair of minimum and maximum values for a given dimension defines a slab for the dimension. For example, xmin and xmax define an x slab in the x dimension, ymin and ymax define a y slab, and zmin and zmax define a z slab. For an intersection test between the ray 130 and the rectangular bounding volume 136 to be true, the ray 130 must be located between slabs for all dimensions simultaneously for a given parametric variable value. As shown, the ray 130 intersects the x slab at t1, the y slab at t2 and the z slab at t3. The ray 130 exits the z slab when the parametric variable is at t4. Therefore, the ray intersection test for ray 130 intersecting the bounding volume 136 is true for t3≤t≤t4, where t is the parametric variable.

Figure 1C:
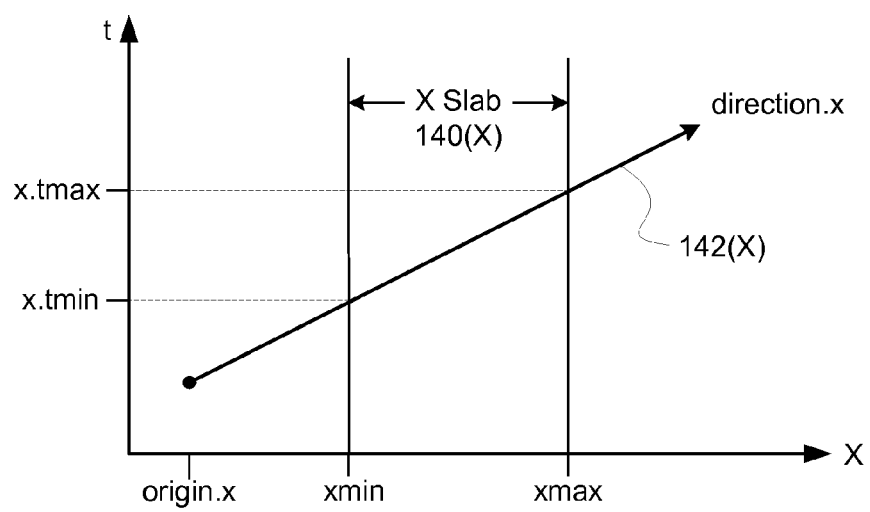
FIG. 1C illustrates a ray intersecting a slab in an x dimension, in accordance with one embodiment.

FIG. 1C illustrates a ray 142(X) intersecting x slab 140(X), in accordance with one embodiment. As shown, the parametric variable is equal to x.tmin when the ray 142(X) is at xmin and the parametric variable is equal to x.tmax when the ray 142(X) is at xmax. In this example, the ray 142(X) may comprise a projection of ray 130 of FIG. 1B onto a coordinate system in x and t.

Figure 1D:
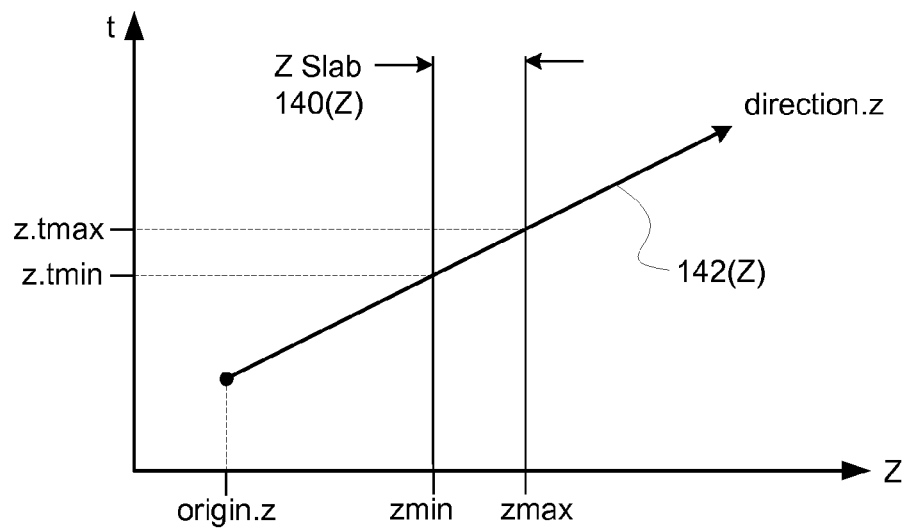
FIG. 1D illustrates a ray intersecting a slab in a z dimension, in accordance with one embodiment.

FIG. 1D illustrates a ray 142(Z) intersecting z slab 140(Z), in accordance with one embodiment. As shown, the parametric variable is equal to z.tmin when the ray 142(Z) is at zmin and the parametric variable is equal to z.tmax when the ray 142(Z) is at zmax. In this example, the ray 142(Z) may comprise a projection of ray 130 of FIG. 1B onto a coordinate system in z and t.

Figure 1E:
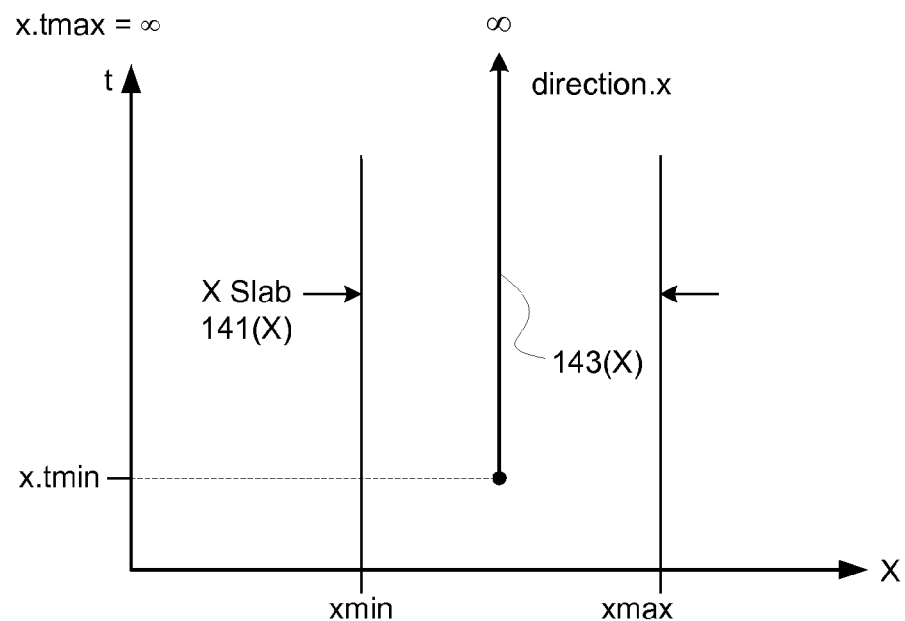
FIG. 1E illustrates a ray bounded by a slab in an x dimension, in accordance with one embodiment.

FIG. 1E illustrates a ray 143(X) intersecting x slab 141(X), in accordance with one embodiment. As shown, the ray remains within x slab 141(X), regardless of the parametric variable value. This may occur when the direction is zero in the x dimension. Here, the origin may correspond to x.tmin, which may be set to zero.

Figure 1F:
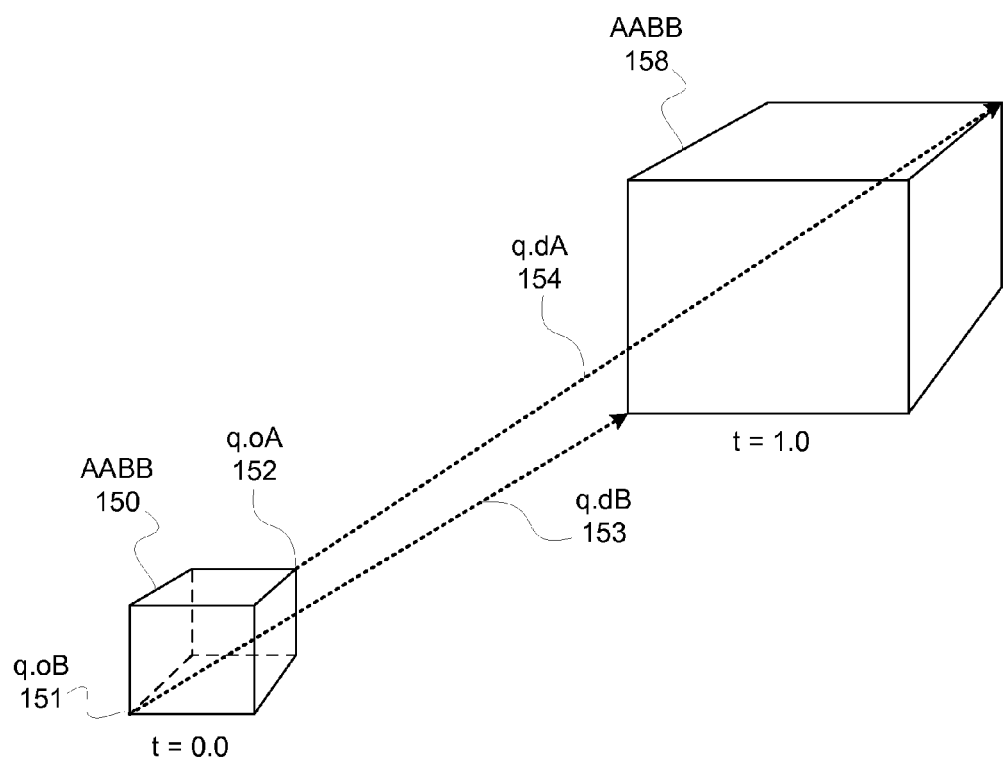
FIG. 1F illustrates a query beam defined by an axis-aligned bounding box swept according to a parametric variable, in accordance with one embodiment.

FIG. 1F illustrates a query beam defined by an axis-aligned bounding box (AABB) swept according to a parametric variable (t), in accordance with one embodiment. An AABB 150 is defined at t=0.0, while an AABB 158 is defined at t=1.0. In this example, the parametric range of the beam is specified by a minimum value of 0.0 and a maximum value of 1.0, so the query beam comprises the entire volume encompassed by sweeping the volume of AABB 150 (t=0.0) linearly through the volume of AABB 158 (t=1.0).

As shown, a maximum origin, q.oA 152, is defined by a maximum corner of AABB 150 at t=0.0, and a minimum origin, q.oB 151, is defined by a minimum corner of AABB 150, also at t=0.0. Similarly, a maximum direction, q.dA 154, is defined as a vector from the maximum origin, q.oA 152, to the maximum corner of AABB 158 at t=1.0, and a minimum direction, q.dB 153, is defined as a vector from the minimum origin, q.oB 151, to the minimum corner of AABB 158 at t=1.0. Referring to step 102 of method 100, the maximum origin q.oA 152 may be positioned at (q.oA.x, q.oA.y, q.oA.z), and the minimum origin q.oB 151 may be positioned at (q.oB.x, q.oB.y, q.oB.z). A first query ray follows a first direction q.dA 154, while a second query ray follows second direction q.dB 153.

Figures 1G, 1H:
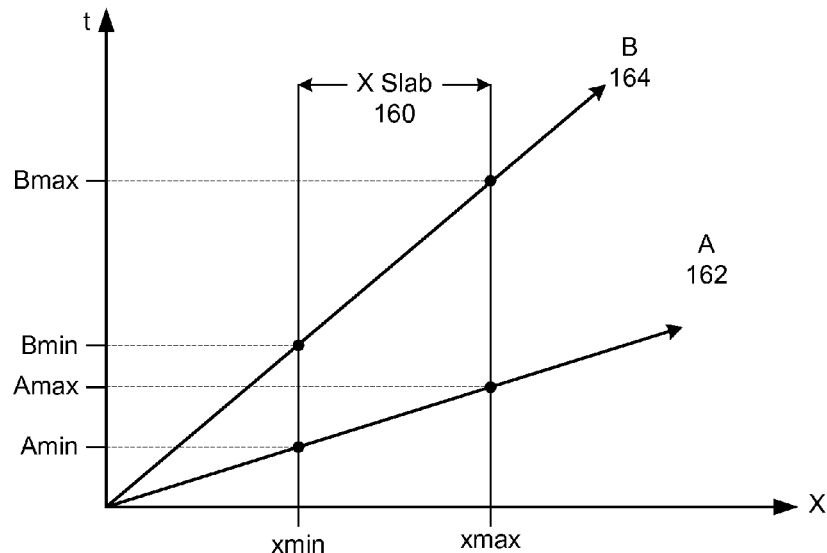
FIG. 1G illustrates a query beam intersection with a slab in an x dimension, in accordance with one embodiment.
FIG. 1H illustrates mappings of different query types to a beam query, in accordance with one embodiment.

FIG. 1G illustrates a query beam intersection with a slab in an x dimension, in accordance with one embodiment. The query beam comprises first query ray A 162 and second query ray B 164. As discussed previously, the first query ray A 162 and second query ray B 164 may be defined according to different origins and different directions. The slab comprises x slab 160, which is shown in a coordinate space defined by the x dimension and the t dimension. The x slab 160 is bounded in the x dimension by xmin and xmax. At xmin, the first query ray A 162 intersects the x slab 160 at t=Amin. Similarly, at xmin the second query ray B 164 intersects the x slab 160 at t=Bmin. At xmax, the second query ray B 164 intersects the x slab 160 at t=Bmax. Similarly, at xmax the first query ray 162 A intersects the x slab 160 at t=Amax. Referring to step 106 of method 100, Amin and Bmax of the present exemplary slab intersection case comprise the intersection parameter values at xmin and xmax, respectively, for the x dimension. In other slab intersection cases, the intersection parameter values may be calculated based on Amin, Amax, Bmin, Bmax, or combinations thereof. In certain embodiments, intersection parameter values for the y dimension (e.g., at ymin and ymax) and the z dimension (e.g., at zmin and zmax) are also calculated. In general, parameter values for the x dimension, y dimension, and z dimension may be calculated according to different and independent slab intersection cases. While the present figure illustrates one exemplary slab intersection case of the query beam and the slab, other slab intersection cases may be encountered during execution of embodiments of the present invention, such as during normal operation of method 100. Additional examples of intersection configurations are set forth in FIGS. 7 and 8.

An intersection query between a query beam and an AABB may be performed according to the pseudo-code of Table 1. In one embodiment, a beam query function, intersect_beam_aabb( ) is implemented by the intersection test engine. As shown, the function intersect_beam_aabb( ) is configured to return a value of TRUE if a query beam q intersects the given AABB, which may be associated, in one embodiment, with a BVH node. The function intersect_beam_aabb( ) receives parameters for query beam object q that comprise a first origin (q.oA), a second origin (q.oB), a first direction (q.dA) and a first inverse direction (q.idA), a second direction (q.dB) and a second inverse direction (q.idB), and a parametric range minimum and maximum (q.tmin, q.tmax). The inverse direction involves computing a reciprocal of the direction per dimension, which may be computed once and used for a plurality of intersection queries.

TABLE 1

```
intersect_beam_aabb(q, aabb)
{
    float xtmin, xtmax, ytmin, ytmax, ztmin, ztmax, tmin, tmax;
    if (q.tmin < 0) ERROR;
    if (q.tmax < q.tmin) ERROR;
    bslab(&xtmin,&xtmax, aabb.xmin,aabb.xmax,
            q.oA.x,q.idA.x,q.dA.x, q.oB.x,q.idB.x,q.dB.x);
    bslab(&ytmin,&ytmax, aabb.ymin,aabb.ymax,
            q.oA.y,q.idA.y,q.dA.y, q.oB.y,q.idB.y,q.dB.y);
    bslab(&ztmin,&ztmax, aabb.zmin,aabb.zmax,
            q.oA.z,q.idA.z,q.dA.z, q.oB.z,q.idB.z,q.dB.z);
    tmin = max(q.tmin,xtmin,ytmin,ztmin);
    tmax = min(q.tmax,xtmax,ytmax,ztmax);
    if (tmin <= tmax)
        return(TRUE,tmin);
    else
        return(FALSE,0);
}
```

As shown, the function bslab( ) is called to calculate and return a minimum value and maximum value for the parametric variable according to a potential intersection for each dimension. An overall minimum value parametric variable (tmin) is selected as the maximum value from a first set of values that includes a minimum value of the parametric variable range for the intersection query (q.tmin), and minimum values of the parametric variable for at least one dimension (xtmin, ytmin, ztmin). An overall maximum value parametric variable (tmax) is selected as the minimum value from a second set of values that includes a maximum value of the parametric variable range for the intersection query (q.tmax), and maximum values of the parametric variable for at least one dimension (xtmax, ytmax, ztmax). The overall minimum and maximum values tmin and tmax define an overall range of the parametric variable where an intersection between the beam and the AABB occurs.

If the overall minimum value parametric variable is less than or equal to the overall maximum value parametric variable (tmin<=tmax), then an intersection test between the query beam and the aabb object is determined to be true. Otherwise, the query beam did not intersect the aabb object and the test is determined to be false. In one embodiment, this determination corresponds to step 112 of method 100, whereby the intersection test engine determines whether the query beam, comprising first query ray A 162 and second query ray B 164, intersects the target bounding volume (aabb) based on at least the parametric range for the first dimension (tmin, tmax). In a scenario involving only the x dimension, tmin is based on xtmin and the query range minimum (q.tmin), and tmax is based on xtmax and the query range maximum (q.tmax). As additional dimensions are included, tmin and tmax are further based on additional parametric variable values for the corresponding dimensions. The pseudo-code illustrates a scenario where the x, y, and z dimensions are considered.

The function bslab( ) of Table 1 may be advantageously performed in accordance with the pseudo-code of Table 2. As shown in Table 2, the function bslab( ) receives beam information for the query beam as parameters comprising the first query origin (q.oA), the first query inverse direction (q.idA), and the first query direction (q.dA) associated with the first query ray, and the second query origin (q.oB), the second query inverse direction (q.idB), and the second query direction (q.dB) associated with the second query ray. In one embodiment, receiving this beam information corresponds to step 102 of the method 100. The function bslab( ) also receives slab boundary information comprising parameters MIN and MAX for a given dimension. In one embodiment, receiving the slab boundary information corresponds to step 104 of the method 100.

TABLE 2

```
void bslab(float *tmin, float *tmax,
        float MIN, float MAX,
        float oA, float idA, float dA,
        float oB, float idB, float dB)
{
    float Amin,Amax,Bmin,Bmax;
    if (oA < oB) ERROR;
    if (dA < dB) ERROR;
    // slab intersection cases determined in if-then-else
    // statements below:
    if (dA > 0.0 && dB > 0.0) {              // case 1
        Amin = (MIN - oA) * idA;
        Bmax = (MAX - oB) * idB;
        *tmin = Amin;
        *tmax = Bmax;
    }
    else if (dA > 0.0 && dB == 0.0) {        // case 2
        Amin = (MIN - oA) * idA;
        Amax = (MAX - oA) * idA;
        *tmin = Amin;
        *tmax = (Amax<0)?Amax:∞;
    }
    else if (dA > 0.0 && dB < 0.0) {  // case 3
        Amin = (MIN - oA) * idA;
        Bmax = (MAX - oB) * idB;
        *tmin = (Amin > 0.0)?Amin:Bmax;
        *tmax = ∞;
    }
    else if (dA == 0.0 && dB == 0.0) {       // case 4
        Amin = (MIN - oA);
        Bmax = (MAX - oB);
        *tmin = (Amin <= 0 && Bmax >= 0) ? 0 : -1;
        *tmax = (Amin <= 0 && Bmax >= 0) ? ∞ : -1;
    }
    else if (dA == 0.0 && dB < 0.0) {        // case 5
        Bmin = (MIN - oB) * idB;
        Bmax = (MAX - oB) * idB;
        *tmin = Bmax;
        *tmax = (Bmin < 0.0) ? Bmin:∞;
    }
    else if (dA < 0.0 && dB < 0.0) {  // case 6
        Amin = (MIN - oA) * idA;
        Bmax = (MAX - oB) * idB;
        *tmin = Bmax;
        *tmax = Amin;
    }
    else
        ERROR;
}
```

Intersection parameter values comprising one or more of Amin, Amax, Bmin, Bmax may be calculated for one or more slab intersection cases based on the beam information and the slab boundary information. In one embodiment, calculating the intersection parameter values corresponds to step 106 of the method 100. Determining a slab intersection case is performed by the if-else selection structure, which performs a series of comparison operations between ray direction information and zero. In one embodiment, this determination process corresponds to step 108 of the method 100. A parametric variable range (tmin, tmax) is assigned based on the slab intersection case. This is shown in the pseudo-code as assignment operations to tmin and tmax based on a slab intersection case. In one embodiment, assigning the parametric variable range corresponds to step 110 of method 100.

In one embodiment, as illustrated by the pseudo-code of Table 2, the beam query may be constrained as follows. The size of AABB0 (150) is required to be non-negative along each dimension (oA>=oB), AABB1 (158) is required to be at least of equal the size to AABB0 (dA>=dB), and the minimum parametric value associated with the beam is required to be non-negative (q.tmin>=0). In case the beam specification fails to conform with these requirements, the implementation may report an error as shown in Table 2. Imposing such requirements may reduce the number of different cases that need to be considered (FIGS. 7A-7E & 8), thereby simplifying the implementation and/or providing other benefits.

The pseudo-code of Table 2 illustrates an exemplary control flow that is sequential in nature. The control flow includes first determining the slab intersection case, and then calculating one set of intersection parameter values based on the slab intersection case, and subsequently assigning the parametric variable range based on the slab intersection case and the one set of intersection parameter values. While this sequential flow is illustrative, certain embodiments may implement a concurrent calculation of two or more sets of intersection parameter values; such an implementation may elect one of the two or more sets of intersection parameter values for assigning the parametric variable range. For example, such embodiments may speculatively perform the calculation of the two or more sets of intersection parameter values prior to a specific slab intersection case determination, while concurrently performing operations associated with determining the slab intersection case. Furthermore, intersection parameter values may be calculated for each of three dimensions concurrently. Assigning the parametric variable range may then be performed as a selection process. Persons skilled in the art will understand that structuring certain operations defined by the pseudo-code of Table 2 for concurrent execution produces equivalent assignment values for the parametric variable range as sequential execution. Furthermore, structuring the operations for concurrent execution may have certain implementation advantages for pipelined hardware architectures. For example, a concurrent execution implementation may provide for lower latency than a sequential implementation.

The function bslab( ) of Table 2 may advantageously perform an assignment of a parametric variable range used to determine whether the query beam intersects the target bounding volume using only two multiplication operations, allowing the function beam( ) of Table 1 to perform an intersection test requiring only two multiplication operations per dimension. For example, a first multiplication may be performed between a first inverse direction (idA, idB) and a first distance between a first origin and a slab minimum (MIN-oA, MIN-oB), and a second multiplication may be performed between a second inverse direction (idB, idA) and a second distance between a second origin and a slab maximum distance (MAX-oB, MAX-oA).

The ability to perform the intersection test using only two multiplication operations is in contrast to the comparable function bslab_naive( ), which requires up to four division operations (more expensive than multiplication operations) per dimension. In certain prior art techniques (not shown), at least six multiplication operations are required per dimension.

Therefore, the technique disclosed in Table 2 advantageously requires fewer and simpler arithmetic operations compared with prior art techniques, such as the prior art technique illustrated in Table 3.

TABLE 3

```
void grow_trange(float *tmin, float *tmax, float tvalue)
{
    *tmin = min(*tmin, tvalue);
    *tmax = max(*tmax, tvalue);
}
void bslab_naive(float *tmin, float *tmax,
            float MIN, float MAX,
            float oA, float dA, float oB, float dB)
{
        // t-range is initially empty.
        *tmin = +inf;
        *tmax = -inf;
        // If the slab intersects the origin of the beam,
        // the t-range must include t=0.
        if (min(oA, oB) <= MAX && max(oA, oB) >= MIN)
                    grow_trange(tmin, tmax, 0.0);
        // Consider each intersection between the two rays
        // and the two planes of the slab in turn.
        // If a given ray intersects a given plane at t>=0,
        // the t-range must include the corresponding
        // intersection point.
        if ((dA>0.0 && oA<=MIN)||(dA<0.0 && oA>=MIN))
                    grow_trange(tmin, tmax, (MIN -oA) / dA);
        if ((dA>0.0 && oA<=MAX)||(dA<0.0 && oA>=MAX))
                    grow_trange(tmin, tmax, (MAX - oA) / dA);
        if ((dB>0.0 && oB<=MIN)||(dB<0.0 && oB>=MIN))
                    grow_trange(tmin, tmax, (MIN - oB) / dB);
        if ((dB>0.0 && oB<=MAX)||(dB<0.0 && oB>=MAX))
                    grow_trange(tmin, tmax, (MAX - oB) / dB);
        // If the direction range of the beam crosses zero
        // and at least one intersection t-value was
        // identified, the beam and slab will keep
        // intersecting all the way to t=+inf.
        if (min(dA, dB)<=0.0 && max(dA, dB)>=0.0 &&
                tmin<=tmax)
                    grow_trange(tmin, tmax, +inf);
}
```

FIG. 1H illustrates mappings of different query types to a beam query, in accordance with one embodiment. As shown, six different tree traversal unit (TTU) query types may be supported by the intersection test engine disclosed herein. The intersection test engine may be configured to perform these different query types by setting up implied terms appropriately. The TTUQ_RAY type includes a single ray query. The TTUQ_RAY type of query does not require a second query ray, but may require the intersection test engine to operate in an appropriate mode. In certain embodiments, however, the TTUQ_RAY type of query is performed as a TTUQ_BEAM_RAY, with q.oB=q.oA and q.dB=q.dA. The TTUQ_BEAM_RAY may be transparently presented to the intersection test engine for evaluation. The TTUQ_BEAM type is a query ray that conforms to the above disclosed techniques for performing a beam query against a target bounding volume. The TTUQ_BEAM_FRUSTUM is similar to the TTUQ_BEAM type, except that the second origin is equal to the first origin. The TTUQ_BEAM_SWEEP is similar to the TTUQ_BEAM type, except that the second direction is equal to the first direction. The TTUQ_BEAM_AABB type has implied terms q.oB=q.oA, and q.dB=-q.dA. In other words, the query beam comprises a box centered about an origin point. With the exception of the TTUQ_RAY query type, each of the above query types may be advantageously presented to the intersection test engine for evaluation without requiring a type indication.

In one embodiment, a ray intersection test is implemented as a beam intersection test, whereby the query beam geometry is generated to envelope the ray with a non-zero cross-section along the path of the ray. The generated query beam may therefore be used for more conservative intersection testing. Conservative intersection testing may produce additional false positive intersection results with AABB targets, but this approach substantially eliminates false negative intersection results that may potentially arise from numerical inaccuracies in the ray/primitive intersection tests, as well as in the ray/beam intersection tests themselves. Additional false positive intersection tests in exchange for substantially eliminating false negative intersection tests an acceptable trade-off because the false positive results typically represent a very small portion of overall intersection tests, while a single false negative can easily produce visible artifacts in a resulting image. Each positive intersection test at the AABB query stage is further subjected to detailed intersection analysis and false positives are therefore substantially discarded, producing no artifacts. In one embodiment, the query beam may be generated using a dilation operator applied to the query ray. In one embodiment, the beam may be generated according to a technique known in the art as Minkowski addition.

System Overview

Figure 2:
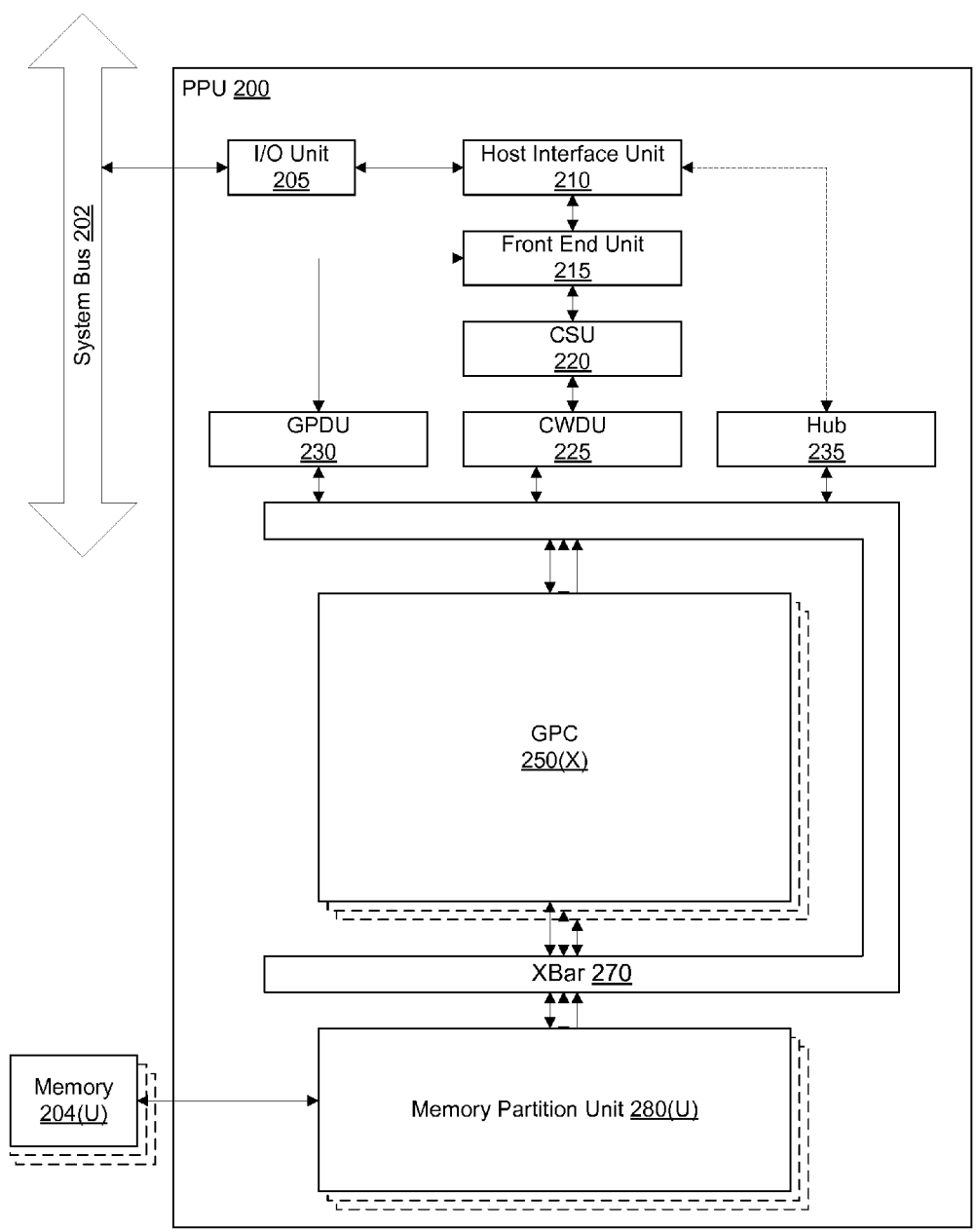
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same thread block may exchange data through shared memory. In one embodiment, a warp comprises 32 related threads.

Figure 3A:
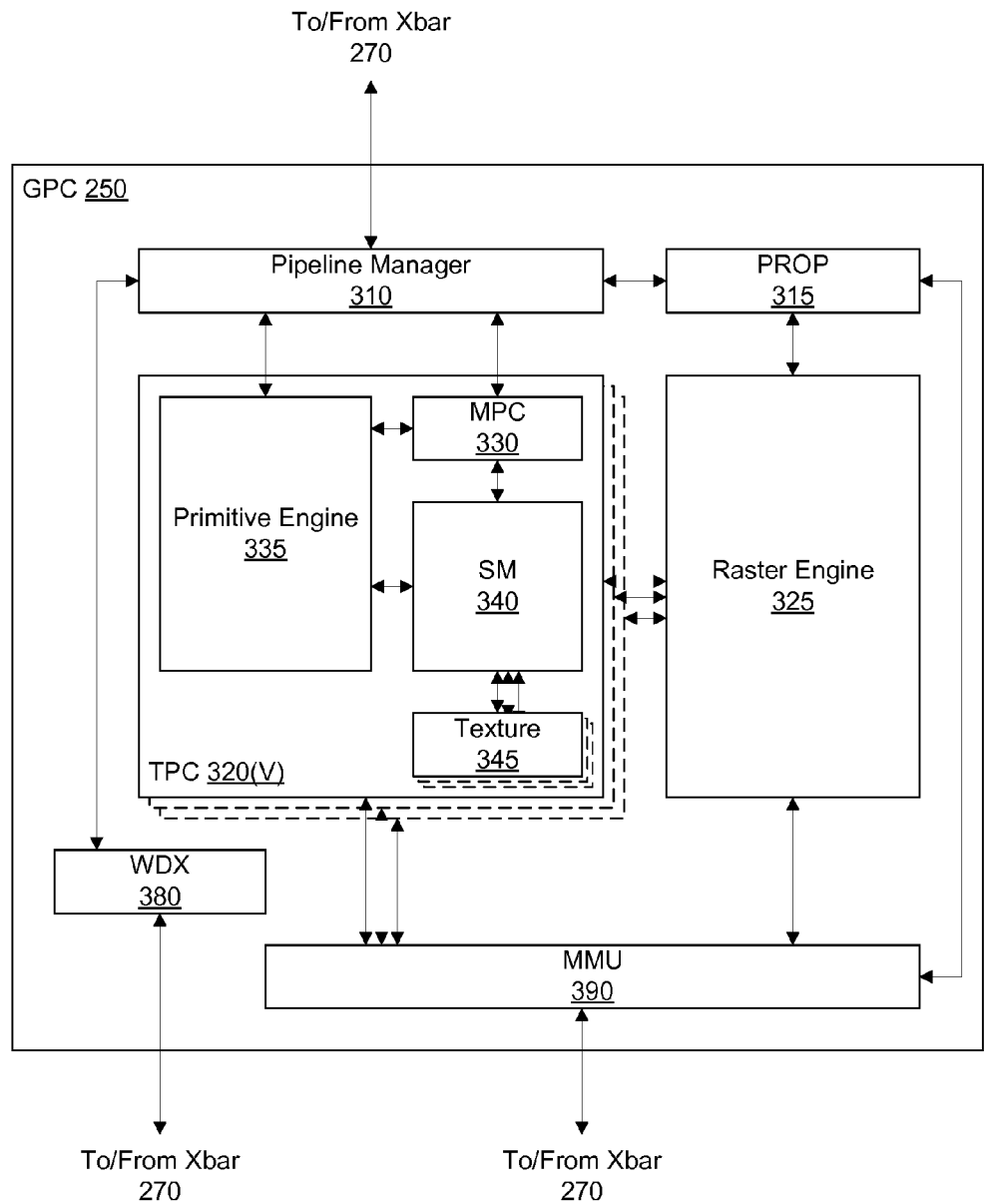
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. Primitives lying outside a viewing frustum may be clipped by the clipping engine. The setup engine receives transformed vertices that lie within the viewing plane and generates edge equations associated with the geometric primitive defined by the vertices. The edge equations are transmitted to the coarse raster engine to determine the set of pixel tiles covered by the primitive. The output of the coarse raster engine may be transmitted to the culling engine where tiles associated with the primitive that fail a hierarchical z-test are culled. Those fragments that survive culling may be passed to a fine raster engine to generate coverage information (e.g., a coverage mask for each tile) based on the edge equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
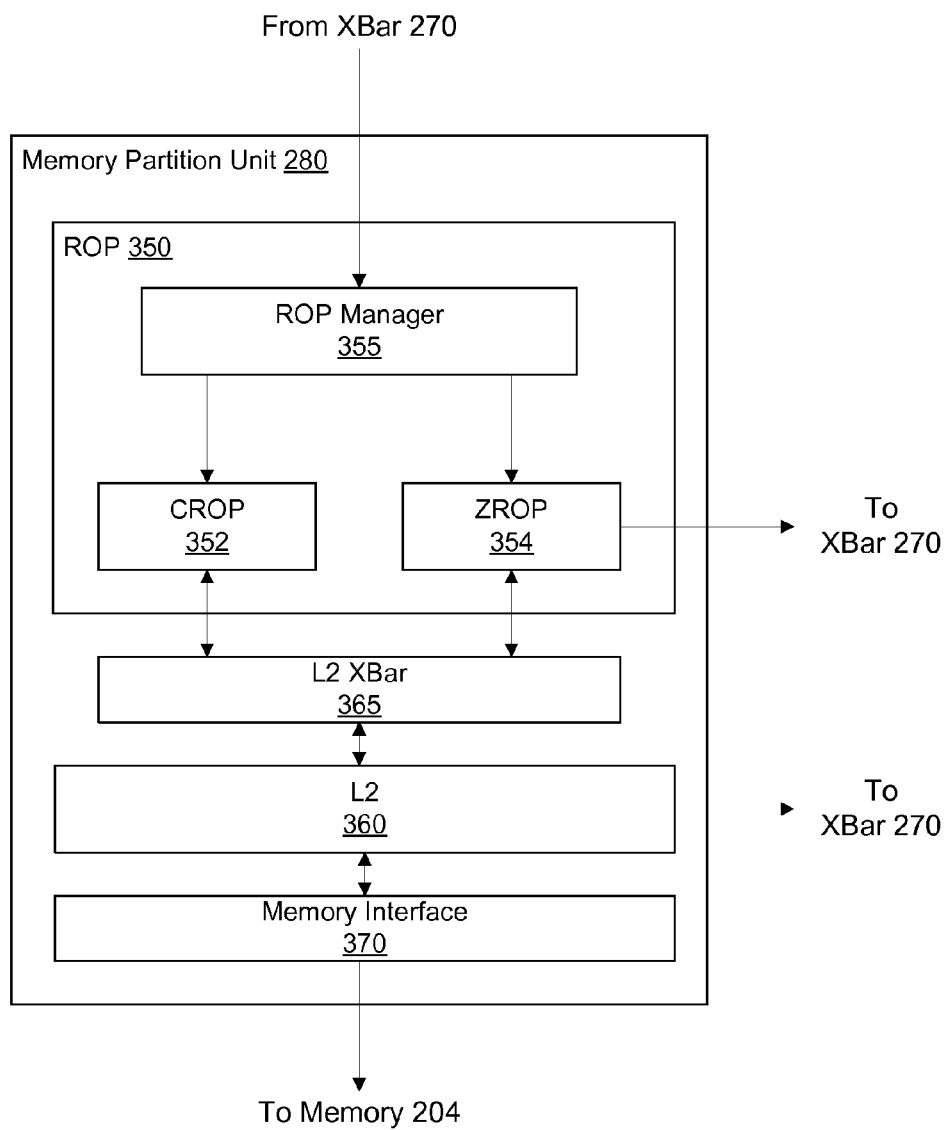
FIG. 3B illustrates a memory partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
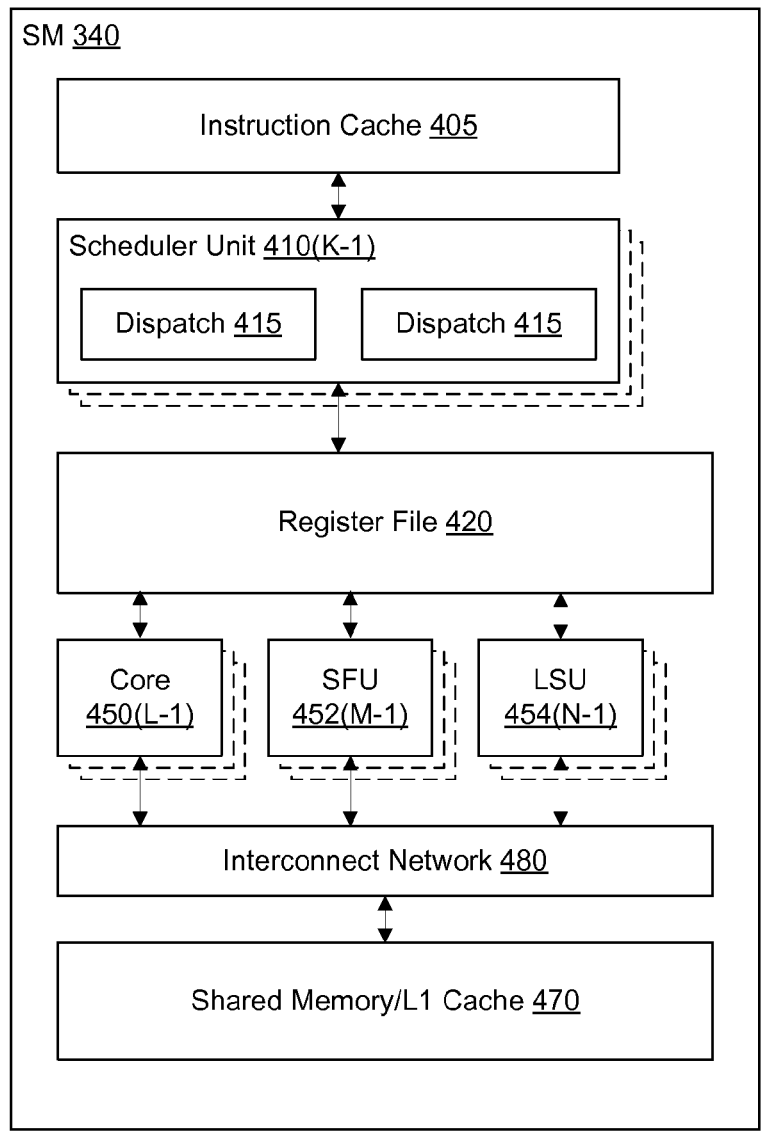
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between subsets of the functional units such that each subset is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., transcendental function evaluation, attribute interpolation, and the like), and N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be executed on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Tree Traversal Unit

Figure 5A:
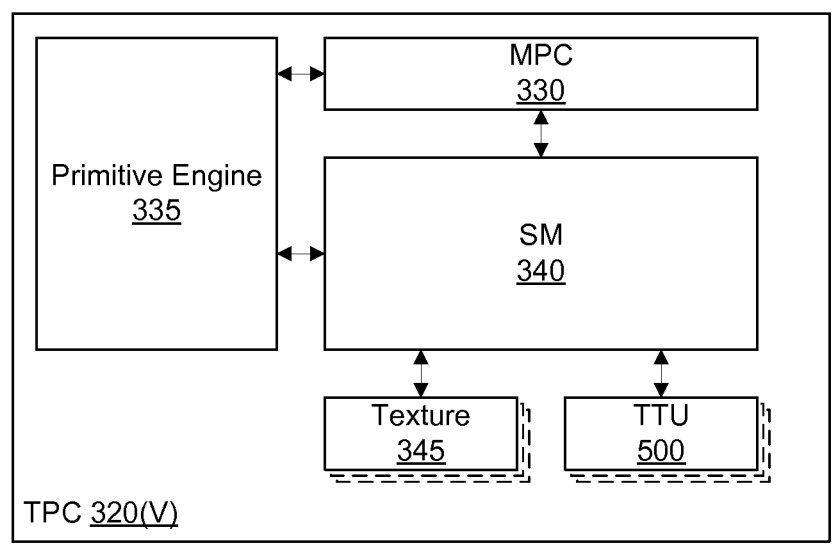
FIG. 5A illustrates a texture processing cluster of FIG. 3A, modified to include one or more tree traversal units, in accordance with one embodiment.

FIG. 5A illustrates a TPC 320 of FIG. 3A, modified to include one or more tree traversal units (TTUs) 500, in accordance with one embodiment. The TTUs 500 are each configured to perform tree traversal operations. Tree traversal operations are commonly utilized in, for example, ray tracing algorithms in computer graphics. However, the TTUs 500 may be optimized for general tree traversal operations and are not limited, specifically, to ray tracing techniques.

In one embodiment, each TPC 320 included in the PPU 200 may include one or more TTUs 500 for performing tree traversal operations. The TTUs 500 are coupled to the SM 340 similar to the texture units 345. It will be appreciated, that in alternate embodiments, the TTUs 500 may be included in the SM 340 similar to the cores 450 or the SFUs 452. Alternately, one or more TTUs 500 may be implemented within the PPU 200 and shared by one or more GPCs 250 or one or more SMs 340.

A tree traversal operation may include any operation performed by traversing the nodes of a tree data structure. A tree data structure may include, but is not limited to, a binary tree, an octree, a four-ary tree, a k-d tree, a binary space partitioning (BSP) tree, and a bounding volume hierarchy (BVH) tree. In one embodiment, the tree traversal operation includes a number of instructions for intersection a query shape with the tree. The query shapes may be, e.g., rays, bounding boxes, frustums, cones, spheres, and the like. In various embodiments, a query shape may be specified by a query data structure. The query data structure may include any technically feasible technique for specifying the query shape to intersect with the tree. For example, the query data structure may specify the starting and ending points of a ray using two three-coordinate vectors. In another example, the query data structure may specify the six planes of an axis-aligned bounding box using six 32-bit floating point coordinates. The various query data structures may include any number of fields for specifying the attributes of the query shape.

For example, one type of tree traversal operation for which the TTU 500 may be optimized is to intersect a ray with a BVH data structure that represents each of the geometric primitives in a 3D scene or 3D model. The TTU 500 may be particularly useful in ray-tracing applications in which millions or even billions of rays are intersected with the geometric primitives of a 3D model represented by a BVH data structure.

Figure 5B:
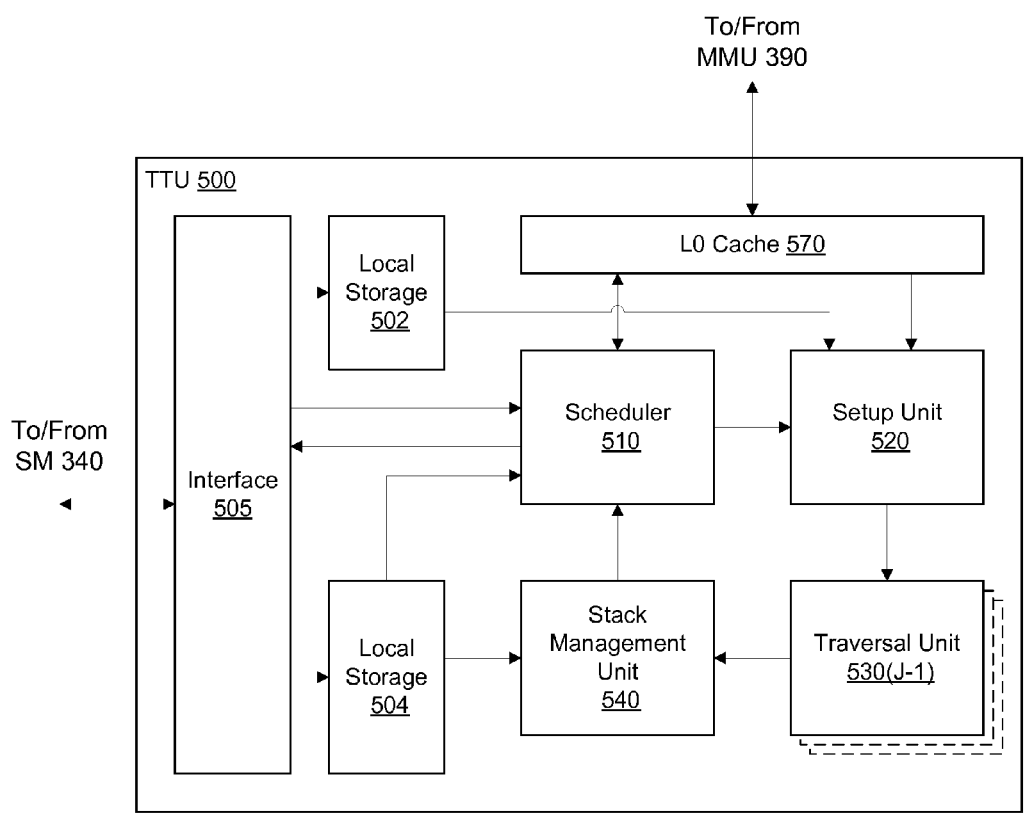
FIG. 5B illustrates a tree traversal unit of FIG. 5A, in accordance with one embodiment.

FIG. 5B illustrates a TTU 500 of FIG. 5A, in accordance with one embodiment. As shown in FIG. 5B, the TTU 500 includes an interface 505, a scheduler unit 510, a setup unit 520, one or more traversal units 530, and a stack management unit 540. The TTU 500 also includes a level-zero (L0) cache unit 570 coupled to a memory architecture hierarchy including one or more L2 caches 360 and memory units 204 via the MMU 390. The TTU 500 also includes local storage 502 for a plurality of query data structures and local storage 504 for a plurality of stack data structures. The local storage 502 and the local storage 504 may be, e.g., static RAM, a latch array, a register file, or the like. It will be appreciated that the TTU 500 may include other hardware units in addition to or in lieu of the hardware units shown in FIG. 5B.

The interface 505 may receive instructions and/or data for performing tree traversal operations from the SM 340. In one embodiment, the SM 340 may transmit the instructions and/or data directly to the interface 505 via a plurality of dedicated interconnects (e.g., wires, paths in a metal layer of a semiconductor, etc.). In another embodiment, the SM 340 may write the instructions to one or more special registers associated with the TTU 500, and the interface 505 may monitor the registers for any updates from the SM 340.

The instructions may include instructions for configuring the TTU 500 to perform a tree traversal operation. The instructions may include operands such as pointers that direct the TTU 500 to a tree data structure and/or a query data structure are located in the memory 204. The interface 505 may cause, at least a portion of, the tree data structure and/or the query data structure to be fetched into the L0 cache unit 570 or the local storage 502.

The L0 cache unit 570 is coupled to the MMU 390 and provides a low-level, local access to the memory architecture hierarchy of the PPU 200. In one embodiment, the L0 cache unit 570 includes a number of entries, where each entry is sized according to a size of a cache line in the memory architecture hierarchy. For example, the L2 cache 360 associated with the memory 204 may implement a cache line having L bytes of information, and the L0 cache unit 570 may include M entries of L bytes to enable up to M cache lines to be stored in the L0 cache unit 570. In one embodiment, the L0 cache unit 570 may include eight entries for cache lines having 128 bytes of data. Of course, the size and number of entries in the L0 cache unit 570 may vary widely between different architectures and other cache line sizes and number of entries are contemplated as being within the scope of various embodiments. Furthermore, the L0 cache unit 570 may include logic in addition to the raw data storage for fetching cache lines from the memory 204 and/or the other hierarchical cache units. For example, the logic may include hardware configured to select particular entries in the L0 cache unit 570 to evict in order to enable other data to be fetched into the L0 cache unit 570. The logic may also include hardware for maintaining cache coherency. For example, the logic may determine when write-back operations need to be performed for dirty cache lines.

In one embodiment, the query data structure associated with a particular tree traversal operation is stored in the local storage 502. The query data structure may specify a query shape to be intersected with a tree data structure. The interface 505 may receive the data for the query data structure and store the data in an available memory location in the local storage 502. The interface 505 may also initialize a stack data structure associated with the query data structure in the local storage 504. The stack data structure may include a portion of memory for creating a stack associated with the particular tree traversal operation. In one embodiment, the stack data structure is initialized by allocating a portion of the local storage 504 to a particular tree traversal operation and pushing a root node for a tree data structure onto the stack data structure. It will be appreciated that pushing a root node onto the stack data structure may be performed by storing a pointer to a data structure for the root node of the tree data structure in a memory location associated with the stack data structure.

The interface 505 may notify the scheduler 510 of an event when the interface 505 receives an instruction that causes a tree traversal operation to be launched by the TTU 500. The event may indicate that the TTU 500 has been tasked with performing a tree traversal operation for a particular tree data structure and a particular query data structure. The scheduler 510 may receive notice of the event via a signal. The signal may be a token that is passed to the scheduler 510 via a data communication channel. The token may include an identifier associated with a particular query data structure stored in the local storage 502.

The scheduler 510 may include a queue (e.g., first-in, first-out or FIFO, etc.) that includes a number of slots that store identifiers for query data structures associated with tree traversal operations. Identifiers may be unique within the scope of the TTU 500. In other words, each identifier uniquely identifies a particular query data structure stored in the local storage 502. In one embodiment, identifiers are allocated to query data structures dynamically when the query data structures are stored in the local storage 502. The queue may be used such that a number of different tree traversal operations may be in-flight in the TTU 500 at any given time, and the queue may be implemented, at least in part, to hide the latency associated with memory operations for fetching node data from the memory 204 into the L0 cache unit 570. In one embodiment, the queue includes, e.g., 32 slots for storing a number of identifiers for query data structures to be intersected with the tree data structure. The total number of slots may be increased or decreased based on latency associated with memory operations, which may be dependent, at least in part, on the details of the memory architecture hierarchy.

The scheduler 510 may also maintain status entries for tracking the status of the tree traversal operations associated with each of the query data structures referenced by identifiers stored in the queue. The status entries may indicate, for example, a scheduling priority for a particular tree traversal operation, whether data associated with the next node to be tested in the tree traversal operation is currently stored in the L0 cache unit 570, whether the tree traversal operation associated with a particular query data structure is currently being processed by the one or more traversal units 530, or whether results for a particular tree traversal operation are available in the memory 204. The scheduler 510 may also notify the SM 340, via the interface 505, of certain events, such as notifying the SM 340 that the data for a particular tree traversal operation is available in the memory 204 or in the register file 420 of the SM 340, or notifying the SM 340 that the queue in the scheduler 510 is full.

Once the scheduler 510 has received an event notification from the interface 505 indicating that the tree traversal operation should be launched, the scheduler 510 may begin to manage the execution of the tree traversal operation. In one embodiment, the scheduler 510 may pop the top element from the stack data structure in the local storage 504 associated with the tree traversal operation. The top element may include a pointer to a location of a node of the tree data structure in the memory 204. The scheduler 510 may issue one or more fetch commands to the L0 cache unit 570 to fetch data associated with the node into the L0 cache unit 570. The fetch commands may include an address of the data to be fetched. For example, the address may point to a root node for a block of the tree data structure. The L0 cache unit 570 will determine if the requested data is in the L0 cache unit 570. If the data is not currently stored in the L0 cache unit 570, then the fetch request results in a cache miss and the data will be fetched from the memory architecture hierarchy, such as L2 cache unit 360 or memory 204, as required. Once the data has been returned from the memory architecture hierarchy, the L0 cache unit 570 will inform the scheduler 510 that the data is available. If the data is currently stored in the L0 cache unit 570, then the fetch request results in a cache hit and the L0 cache unit 570 will inform the scheduler 510 that the data is immediately available. It will be appreciated that the data associated with a particular node may be included in data associated with a plurality of nodes of the tree data structure that are stored in contiguous memory and comprise a single cache line. Therefore, each fetch request may result in data for more than one node being loaded into the L0 cache unit 570.

Once the data has been fetched into the L0 cache unit 570, the scheduler 510 transmits a request to the setup unit 520 to initiate the tree traversal operation for one or more nodes of the tree data structure. The setup unit 520 may perform any number of operations for configuring the one or more traversal units 530 to perform the tree traversal operation. For example, in one embodiment, the setup unit 520 may fetch the data associated with the query data structure and the data associated with one or more nodes of the tree data structure from the local storage 502 and the L0 cache unit 570, respectively. In another embodiment, the setup unit 520 may transform coordinates associated with the query data structure from a global coordinate system into a local coordinate system. In another embodiment, the setup unit 520 may configure one or more traversal units 530 to execute instructions for performing the tree traversal operation for one or more nodes of the tree data structure.

In one embodiment, the TTU 500 is configured to perform tree traversal operations on blocks of a tree data structure. As used herein, a block may include one or more nodes of the tree data structure that fit within a particular cache line. The block may include a block root node having zero or more child nodes that are also included in the block. Each of the zero or more child nodes may also include corresponding child nodes, those corresponding child nodes may include one or more additional child nodes, and so forth. Some or all of the corresponding child nodes and/or the additional child nodes may also be included in the block. A block may be defined as no larger than a cache line (e.g., 128 bytes, etc.) and may contain a fixed or variable number of nodes. It will be appreciated that the tree data structure may include a plurality of blocks that together represent all of the nodes in the tree data structure.

The one or more traversal units 530 may receive data for a particular query data structure to intersect with one or more nodes of the tree data structure. Each traversal unit 530 may be configured to test each of the child nodes of a particular node for intersection with the query data structure. If the query data structure intersects the child node, then the child node is added to a local stack data structure. Once all of the child nodes of the particular node have been tested, then the traversal unit 530 may be configured to check the local stack data structure. If the local stack data structure is empty, then no nodes need to be tested for intersection with the query data structure, and the traversal unit 530 may notify the stack management unit 540 that the tree traversal operation has been completed, at least for the nodes in that particular block of the tree data structure. However, if the local stack data structure is not empty, then the top element is popped from the local stack data structure and the process is repeated for this new node.

If a particular node being tested by the traversal unit 530 is a leaf node and is intersected by the query data structure, then the elements associated with the leaf node may be added to a result queue. If the particular node being tested by the traversal unit 530 is an internal node that is included in another block of the tree data structure, then the node included in the other block may be added to a result queue.

In one embodiment, the traversal units 530 may implement a pipelined architecture in order to hide latency associated with a particular operation performed for each node. For example, a pipelined architecture may be implemented for an intersection test that takes a number of cycles to complete such that a number of intersection tests for different nodes and different query data structures may be in flight at any given time within a traversal unit 530. In other words, each traversal unit 530 may be performing tree traversal operations for a number of different nodes and a number of different query data structures substantially simultaneously.

In one embodiment, each traversal unit 530 includes a local storage for storing a number of different blocks of the tree data structure. The local storage may be a temporary location comprising static RAM for storing one or more cache lines included in the L0 cache unit 570 and needed for performing a tree traversal operation for a particular query data structure. For example, the local storage may include 5 slots of 128 bytes for storing up to five cache lines from the L0 cache unit 570 that include data for up to five different blocks of the tree data structure (or different tree data structures). The data in up to four of the slots in the local storage may be accessed by the logic of the traversal unit 530 during any given clock cycle, and data for the remaining slot may be written to the local storage by the setup unit 520 during the clock cycle. Each traversal unit 530 may also include local storage for storing a number of query data structures. The number of query data structures stored locally in the traversal unit 530 may be equal to the number of available slots for storing blocks of the tree data structure. Similarly, each traversal unit 530 may include local storage for storing a number of local stack data structures used for traversing the different blocks of the tree data structure.

The stack management unit 540 receives the results of a tree traversal operation from the result queue. The result queue may include leaf data such as a geometric primitive to be tested for intersection with a query shape as well as nodes (or rather pointers to nodes) included in other blocks of the tree data structure. In one embodiment, the stack management unit 540 transmits leaf data such as the geometric primitives to the SM 340. As described herein, the leaf data may represent those elements stored in the tree data structure that are potentially intersected by the query data structure. The SM 340 may be configured to process the results of the tree traversal operation by any means necessary. For example, if the results of the tree traversal operation include a set of geometric primitives, the SM 340 may be configured to test those particular geometric primitives for intersection with the query data structure. It will be appreciated that testing a geometric primitive included in a leaf node, such as a triangle or quad, for intersection with the query data structure is a different type of operation than testing a leaf node, associated with a bounding volume, for intersection with the query data structure. The SM 340 may also be configured to launch one or more additional tree traversal operations for new query data structures based on the processing of the geometric primitives included in the results.

The stack management unit 540 may also manage traversal stacks for each of the tree traversal operations currently being executed by the TTU 500. A traversal stack may refer to a data structure that temporarily stores particular nodes in the tree data structure that need to be tested against the query data structure during future iterations of the processing loop. A non-empty traversal stack that includes one or more nodes of the tree data structure indicates that at least a portion of the tree traversal operation still needs to be scheduled for execution by the one or more traversal units 530.

When the stack management unit 540 receives a pointer to a node for a new block of the tree data structure in the result queue, the stack management unit 540 adds the node to the traversal stack for a particular tree traversal operation. The stack management unit 540 may be notified once the one or more traversal units 530 have completed testing the nodes of a given block of the tree data structure. In one embodiment, the one or more traversal units 530 may notify the stack management unit 540 of an event by including a signal and/or data in the result queue that indicates the one or more traversal units 530 have completed executing the tree traversal operation for a block of the tree data structure. Once the stack management unit 540 receives the event, the stack management unit 540 may cause the scheduler 510 to initiate the next portion of the tree traversal operation for a different block associated with a node included in the traversal stack. In other words, the scheduler unit 510 may retrieve the top element (i.e., a new node) from the traversal stack included in the local storage 504, fetch any data required for performing the tree traversal operation for the new node into the L0 cache unit 570 and/or local storage 502, and notify the setup unit 520 to configure the one or more traversal units 530 to perform the tree traversal operation for one or more nodes in the new block of the tree data structure.

Although the TTU 500 described above has been described relative to a tree traversal operation for a general query data structure as applied to a general tree data structure, the TTU 500, in some embodiments, may be configured to perform a tree traversal operation for a specific application, such as ray-tracing. In other words, a tree traversal operation may be limited to intersecting a ray with a tree that represents a plurality of geometric primitives. The tree may be implemented as a bounding volume hierarchy (BVH), spatial subdivision tree, and the like. The operation of the TTU 500 as applied to a ray-tracing application in association with a BVH will be described in more detail below.

In order to intersect a ray with the BVH, the SM 340 may transmit an instruction to the interface 505 of the TTU 500. In response to the instruction, the interface 505 may load a ray data structure into the local storage 502 and initialize a traversal stack data structure in the local storage 504. The interface 505 may also push a root node for the BVH onto the traversal stack data structure. The interface 505 may also assign a ray identifier to the ray data structure in the local storage 502 for identifying the particular ray data structure associated with a particular tree traversal operation. In a typical ray-tracing algorithm utilized to create a computer generated image, hundreds, thousands, or even millions of rays may be cast and intersected with the tree data structure. Thus, the ray identifier provides a useful way for tracking and identifying a tree traversal operation in flight in the TTU 500 for a particular ray.

The ray data structure may be stored in the local storage 502 such that the ray data structure may be quickly accessed during the tree traversal operation associated with the ray. A ray may be defined, e.g., by a set of tuples specifying a starting coordinate and an ending coordinate, or, alternately, a starting coordinate, a direction, and a magnitude. The ray data structure may include one or more coordinates for specifying the ray, one or more attributes of the ray, and so forth. In one embodiment, the ray data structure includes two vectors for specifying the endpoints of the ray, each vector comprising three 32-bit floating point values for specifying the coordinates of a point relative to a global coordinate system, as well as one or more attributes such as flags that specify how particular types of graphics primitives encountered during the tree traversal operation are to be processed.

The interface 505 may notify the scheduler 510 of a ray event that indicates that the TTU 500 received an instruction requesting a tree traversal operation to be performed for a given ray data structure. The interface 505 may pass a ray identifier for the ray data structure stored in the local storage 502 to the scheduler 510 as part of the ray event.

As long as the queue includes at least one ray identifier that needs to be processed by the one or more traversal units 530, the scheduler 510 may choose a particular tree traversal operation from the queue to be launched on the one or more traversal units 530. The particular tree traversal operation may be selected by selecting one of the ray identifiers included in the queue of the scheduler 510. Any technically feasible means for selecting a particular ray identifier from the queue may be implemented by the scheduler 510, such as a priority-based algorithm, a round-robin algorithm, and the like.

In one embodiment, the scheduler 510 searches the queue for ray identifiers that are ready to be launched. The scheduler 510 may select a particular ray identifier ready to be launched and fetch the top element from the traversal stack data structure corresponding to the ray identifier. The top element may comprise a pointer to a node of the BVH. The scheduler 510 may then issue a fetch request to the L0 cache unit 570 to fetch the data corresponding to the pointer to the node. If the data is not currently stored in the L0 cache unit 570, then the data is fetched from memory and the scheduler 510, during the next clock cycle, may select another ray identifier from the queue to try and launch. However, if the data is currently stored in the L0 cache unit 570, then the scheduler 510 transmits a request to the setup unit 520 to launch the tree traversal operation for that node.

In one embodiment, the node represents the root node for a block of the BVH. The setup unit 520 and one or more traversal units 530 will be configured to traverse all of the nodes of the block, intersecting each node of the block with the ray data structure corresponding to that particular tree traversal operation. In one embodiment, the setup unit 520 fetches the ray data structure associated with the tree traversal operation from the local storage 502. The setup unit 520 may also fetch the data for the block including the node from the L0 cache unit 570. In one embodiment, the setup unit 520 performs one or more operations for preparing to execute the tree traversal operation. For example, in one embodiment, the setup unit 520 transforms the coordinates associated with the ray data structure from a global coordinate system to a local coordinate system associated with a root node of the block. In another embodiment, the setup unit 520 may test the root node of the block for intersection with the ray data structure. If the root node of the block intersects the ray data structure then each of the child nodes of the root node may be passed to a particular traversal unit 530 to continue traversing the BVH in parallel. In one embodiment, the TTU 500 may include four traversal units 530 to test up to eight child nodes for intersection with the ray in parallel. The number of traversal units 530 that are implemented in a given TTU 500 may be optimized for the types of trees that are typically traversed. In yet another embodiment, the setup unit 520 may transmit the root node of the block to one of the available traversal units 530.

When a node is received at a tree traversal unit 530 from the setup unit 520, the node is inserted into a local stack data structure. The local stack data structure is similar to the traversal stack data structure except the depth of the local stack data structure may be limited due to the fixed size of a block of the tree data structure. The traversal unit 530 then enters a loop where the traversal unit 530 determines if the local stack data structure is empty. If the local stack data structure is empty, then the traversal unit 530 has completed the traversal of the block. However, if the local stack data structure is not empty, then the traversal unit 530 pops the top entry from the local stack data structure. If the top entry is a leaf node and the lead node intersects the ray data structure, then the data (e.g., geometric primitives) stored in the leaf node is added to a result queue. However, if the top entry is an internal node (i.e., a node that includes one or more child nodes, etc.), then the ray data structure is intersected with the node to determine if the ray intersects the node. If the ray data structure does not intersect the node, then nothing is added to the local stack data structure, and the loop is repeated if the local stack data structure is not empty. If the ray data structure intersects the node, then each of the child nodes of the node included in the block are added to the local stack data structure and the loop is repeated. However, if the child nodes of the intersected node are not included in the block (i.e., the child nodes are included in a different block of the tree data structure, etc.), then the child nodes may be added to the result queue. Once the local stack data structure is empty, the tree traversal operation for the block is complete and any data included in the result queue may be passed to the stack management unit 540.

The stack management unit 540 may read the result queue and update the traversal stack data structure in the local storage 504 by adding any child nodes included in the result queue to the top of the traversal stack data structure. The stack management unit 540 may also transmit any geometric primitives included in the result queue to the SM 340. Again, the geometric primitives included in the result queue were those primitives associated with nodes (i.e., bounding volumes) that intersected the ray and, therefore, are the results associated with a particular tree traversal operation intersecting the ray with the BVH. Once the traversal stack data structure in local storage 504 has been updated and the one or more traversal units 530 have indicated to the stack management unit 540 that the tree traversal of the block of the tree data structure is complete, the stack management unit 540 may indicate to the scheduler 510 that the tree traversal operation for the particular ray data structure is ready to be re-launched if the traversal stack data structure is not empty.

The preceding description of the TTU 500, in accordance with one embodiment, utilizes an optimized block-based tree traversal algorithm that is discussed in more detail below. It will be appreciated that the architecture of the TTU 500 may be optimized for different types of tree traversal algorithms, and that the architecture of the TTU 500 may be changed for different algorithms utilized for different types of hardware architectures. The block-based tree traversal algorithm is just one method for optimizing tree traversal operations on high-latency memory architecture systems such as the PPU 200. In one embodiment, the various units of the TTU 500 (e.g., the setup unit 520, the traversal units 530, etc.) may be implemented as fixed function logic, configured to implement the functionality of each of the units described above. In another embodiment, one or more of the units of the TTU 500 may be programmable logic devices that are configured to execute instructions transmitted to the TTU 500 by the SM 340 or read from the memory 204. The units may execute the instructions to implement the functionality of each of the units described above in a programmable manner. For example, the traversal units 530 may be programmable devices configured to execute a program stored in the memory 204 to process one or more nodes of the tree data structure.

Figure 6A:
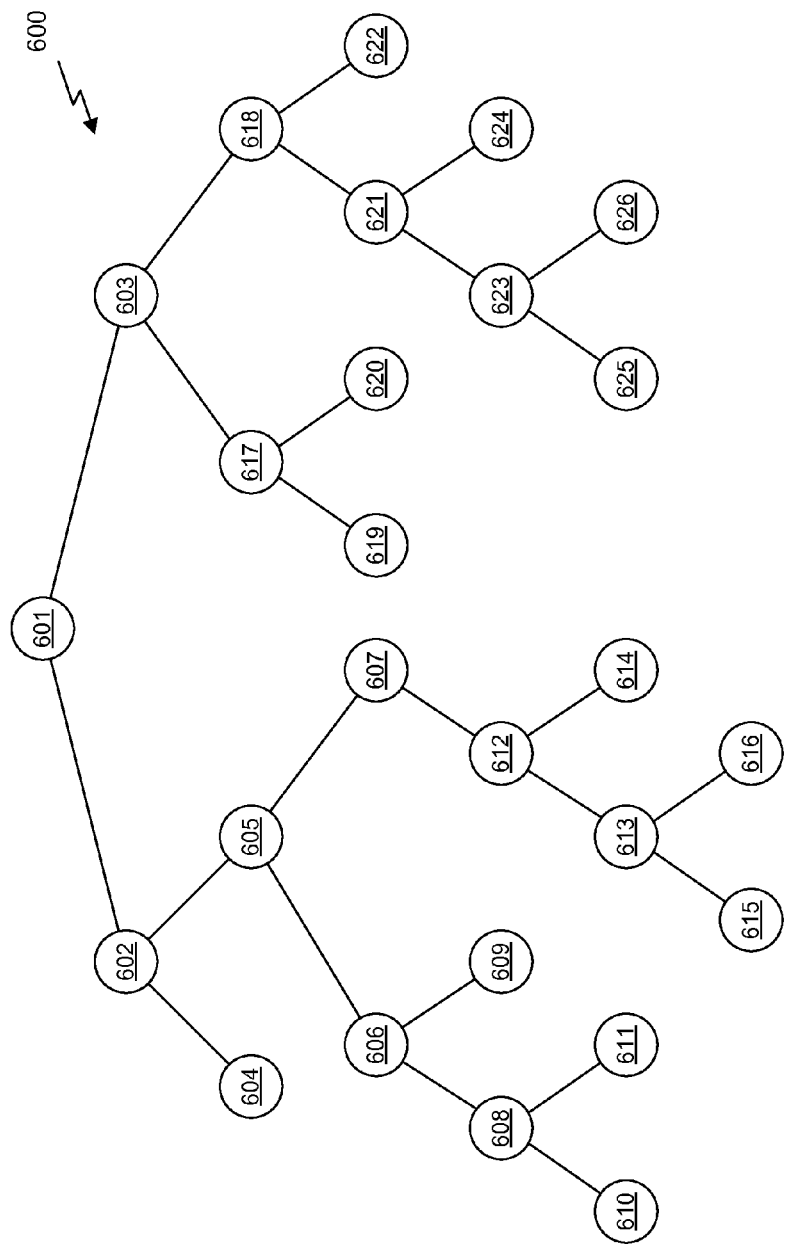
FIGS. 6A & 6B illustrate a typical tree data structure that represents a bounding volume hierarchy (BVH) associated with a 3D model, in accordance with the prior art.
Figure 6B:
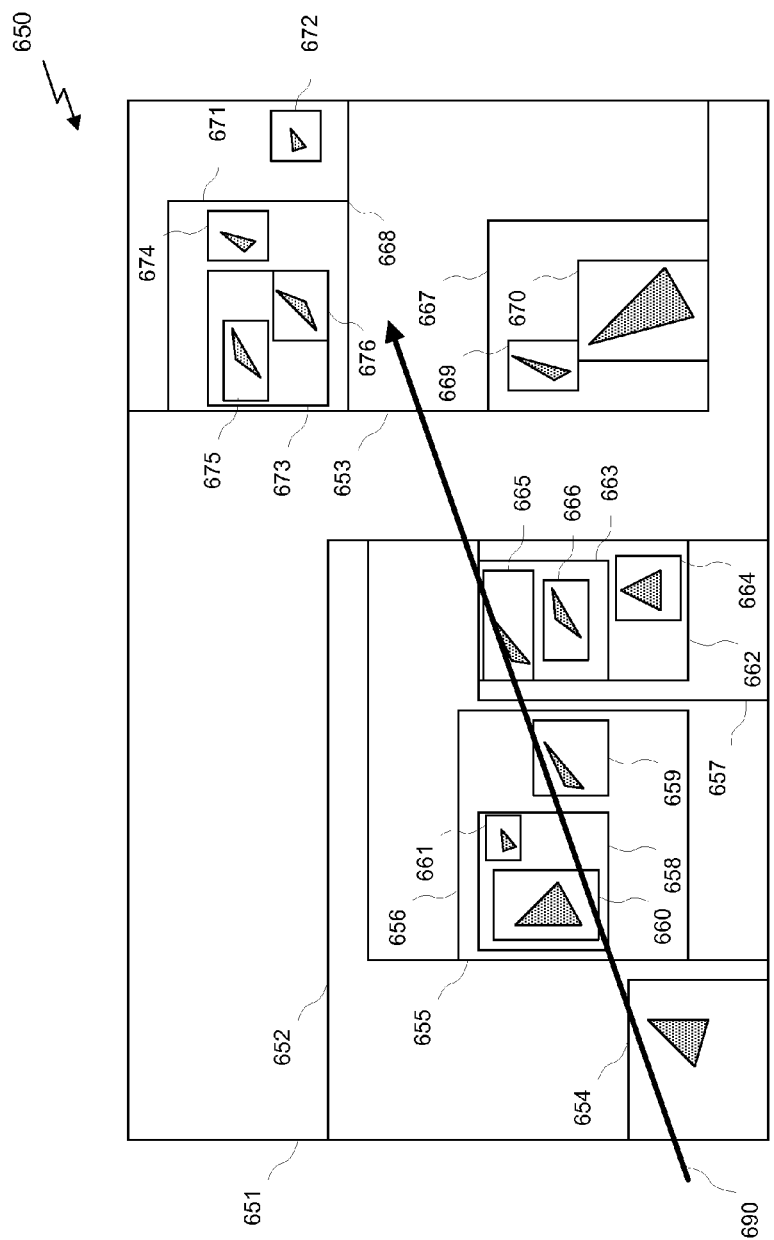

FIGS. 6A & 6B illustrate a typical tree data structure 600 that represents a bounding volume hierarchy (BVH) 650 associated with a 3D model, in accordance with the prior art. The tree data structure 600 includes a plurality of nodes, and each node has zero or more child nodes. The tree data structure 600 includes a root node 601 that indicates the start of the tree data structure 600. All other nodes in the tree data structure 600 descend from the root node 601. Nodes having zero child nodes may be referred to as leaf nodes. Leaf nodes may include one or more elements or a pointer to one or more elements stored in the tree data structure 600. Leaf nodes may be associated with a bounding volume that encloses one or more elements of the 3D model. For example, the elements may include geometric primitives of the 3D model. The tree data structure 600 includes leaf nodes 604, 609, 610, 611, 614, 615, 616, 619, 620, 622, 624, 625, and 626. Nodes that include one or more child nodes may be referred to as internal nodes. Internal nodes may be associated with a bounding volume that encloses the elements of the 3D model associated with the descendent leaf nodes of the internal node. The tree data structure 600 includes internal nodes 601, 602, 603, 605, 606, 607, 608, 612, 613, 617, 618, 621, and 623.

As shown in FIG. 6A, the tree data structure 600 is a binary tree data structure. In one embodiment, the binary tree data structure represents a BVH 650 associated with a 3D scene or 3D model that includes a number of geometric primitives, as shown in FIG. 6B. It will be appreciated that the tree data structure 600 is shown for illustration only and is quite small when compared to tree data structures generated from typical 3D models in, for example, computer graphics. Such tree data structures may contain thousands or millions of nodes.

As shown in FIG. 6B, a 3D model comprising a number of geometric primitives (i.e., the shaded triangles) may be associated with a BVH 650. In other words, each geometric primitive may be associated with a bounding volume that fully encloses the geometric primitive and then multiple geometric primitives in close proximity may be bounded by a higher-level bounding volume. The hierarchy is established through multiple levels of larger and larger bounding volumes until a single bounding volume encloses all of the lower-level bounding volumes. The single bounding volume may be associated with the root node 601 in the tree data structure 600.

It will be appreciated that the illustration of the BVH 650 is shown in two dimensions, rather than three dimensions, and that the bounding volumes are illustrated as bounding rectangles. However, the abstract concepts illustrated herein for a two-dimensional system may be applied equally as well to higher-dimensional system (e.g., a three-dimensional system, etc.) using, for example, axis-aligned bounding boxes (AABB). In addition, the bounding volumes are not limited to AABBs. In other embodiments, bounding volumes may be spheroid, cylindrical, or any other closed geometric surface.

As shown in FIG. 6B, the BVH 650 includes bounding boxes 651, 652, 653, 655, 656, 657, 658, 662, 663, 667, 668, 671, and 673, which correspond to nodes 601, 602, 603, 605, 606, 607, 608, 612, 613, 617, 618, 621, and 623 of the tree data structure 600, respectively. These bounding boxes contain one or more additional lower-level bounding boxes. Similarly, the BVH 650 includes bounding boxes 654, 659, 660, 661, 664, 665, 666, 669, 670, 672, 674, 675, and 676, which correspond to nodes 604, 609, 610, 611, 614, 615, 616, 619, 620, 622, 624, 625, and 626 of the tree data structure 600, respectively. These bounding boxes contain one or more geometric primitives and, therefore, are represented in the tree data structure 600 by the leaf nodes.

FIG. 6B also shows a ray 690 that is associated with a tree traversal operation. Ray-tracing techniques, for example, involve the operation of intersecting a plurality of rays with the geometric primitives of a model. One method of performing the ray-tracing operations is to generate a tree data structure that represents the model. Then, for each ray generated by the rendering algorithm, the ray is tested against the tree data structure to determine which geometric primitives are intersected by the ray. The tree data structure significantly decreases the time required to determine which geometric primitives are intersected by the ray by discarding large groups of geometric primitives when a bounding volume that contains a subset of the geometric primitives is not intersected by the ray.

Beam and Slab Examples

FIGS. 7A-7E & 8 illustrate exemplary valid configurations of a query beam with respect to a slab, in accordance with one embodiment. Each figure illustrates three configurations where the relative positioning between the slab and the query beam are different, while the direction vectors of a beam are constant within each figure. Alongside each configuration, the figure indicates both the geometrically correct t span for that configuration, as well as a functionally equivalent t span as produced by the pseudocode in Table 2. The functionally equivalent t spans correspond to the geometrically correct t spans for all non-negative values of t. Hence, assuming that q.tmin$\geq$=0, correct results may be obtained. The slab may be associated with a pair of bounding planes associated with a target bounding volume. The bounding planes are shown here to be associated with the x dimension, but may be associated with another dimension. In each configuration, a query beam includes a first ray (A) with origin oA and direction dA, and a second ray (B) with origin oB and direction dB. The first ray may project at a non-zero angle with respect to the slab and intersect the slab at Amin and/or Amax. The first ray may also project parallel to the boundaries of the slab and either never intersect the slab or always intersect the slab. Similarly, the second ray may project at a non-zero angle with respect to the slab and intersect the slab at Bmin and/or Bmax. The second ray may also project parallel to the slab and either never intersect the slab or always intersect the slab. The valid configurations may be restricted to the subset where oA>=oB and dA>=dB.

While valid configurations are shown in FIGS. 7A-7E & 8, other invalid configurations may also exist. For example, configurations where oA<oB and/or dA<dB represent invalid configurations. In certain embodiments, the intersection test engine described previously is configured to accommodate invalid configurations in order to perform a valid and predictable intersection test. For example, in one embodiment, if oA<oB, then oA and oB are swapped before an intersection test is performed according to the techniques of Table 1 and Table 2. Swapping oA and oB yields a wider beam geometry that encompasses the geometry of the query beam, thereby providing for a valid and conservative intersection test. In one embodiment, if dA<dB, then oA and oB are swapped, and dA and dB are swapped before the intersection test is performed. In each invalid configuration (oA<oB and/or dA<dB), the query beam geometry may be inherently valid but not compatible with the intersection query techniques of Table 1 and Table 2. In such scenarios, simply performing the above swap provides a valid and conservative configuration for performing an intersection test.

A given query beam includes a region between the first ray and the second ray, starting at t=0 and projecting in the direction of the first and second rays, for t≥0. As shown, the query beam includes a counter-clockwise (left-to-right) region starting with ray A and rotating (moving) towards ray B. For example, in FIG. 7A, the query beam is formed by the origins of rays A and B at t=0 and projects upwards in the direction of the rays A and B (t≥0). The region between rays A and B below the intersection of rays A and B cannot be part of the query beam region, by virtue of the requirements placed on valid beam configurations.

Figure 7A:
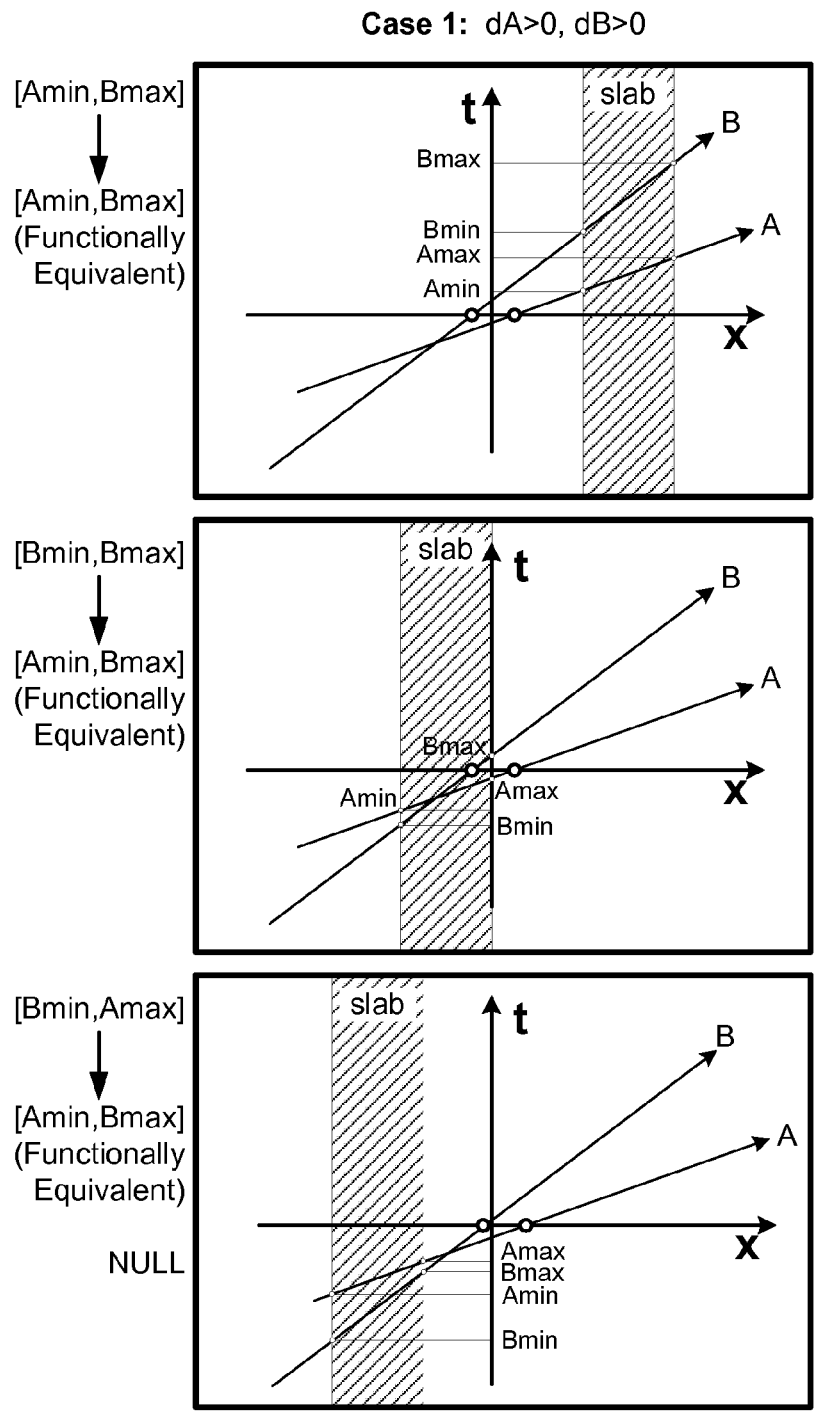
FIGS. 7A-7E & 8 illustrate exemplary valid configurations of a query beam with respect to a slab, in accordance with one embodiment.

The top example of FIG. 7A includes a minimum value parametric variable (tmin) at Amin and a maximum value parametric variable (tmax) at Bmax. The parametric variable range of tmin to tmax is indicated in brackets to the left of each example. In the top example, the tmin to tmax parametric variable range is shown as [Amin, Bmax]. The middle example of FIG. 7A is labeled [Bmin, Bmax] to indicate a tmin value of Bmin and a tmax value of Bmax. However, both Amin and Bmin occur below the intersection of rays A and B and therefore, in one embodiment, both Amin and Bmin must correspond to negative parametric variable values. Because a negative parametric variable value indicates a point along a ray that is not included within a query beam, Amin and Bmin are equivalent in this example for the purpose of an intersection test and in the middle example the parametric variable range [Amin, Bmax] is equivalent to the indicated parametric variable range [Bmin, Bmax] for the purpose of performing an intersection test. In the bottom example of FIG. 7A, Amin, Bmin, Amax, and Bmax each correspond to a negative value oft, and are equivalent to each other for the purpose of an intersection test, and the indicated parametric variable range [Bmin, Amax] is equivalent to the parametric variable range [Amin, Bmax] for the purpose of performing an intersection test. The bottom example of FIG. 7A is marked "NULL" to indicate no intersection between the slab and the query beam.

The equivalence of negative parametric variable values in performing a beam intersection test advantageously enables a simplification of different sets of query beam configurations into a single rule per slab intersection case. For example, each of the different configurations illustrated in FIG. 7A conform to a single slab intersection case identified in Table 2 as case 1 (dA>0.0 && dB>0.0), and consequently each different configuration illustrated in FIG. 7A may be tested for intersection using a single rule to define a parametric variable range of [Amin, Bmax]. Similarly, each of the different configurations illustrated in FIG. 7B conform to a single slab intersection case identified in Table 2 as case 2 (dA>0.0 && dB==0.0), and consequently each different configuration illustrated in FIG. 7B may be tested for intersection using a single rule to define a parametric range of [Amin, (Amax<0)?Amax, ∞]. Furthermore, the configurations illustrated in FIG. 7C correspond to case 3 of Table 2, the configurations illustrated in FIG. 7D correspond to case 5 of Table 2, the configurations illustrated in FIG. 7E correspond to case 6 of Table 2, and the configurations illustrated in FIG. 8 correspond to case 4 of Table 2. In each case, a single rule may be used to define a corresponding parametric range [tmin, tmax].

Figure 7B:
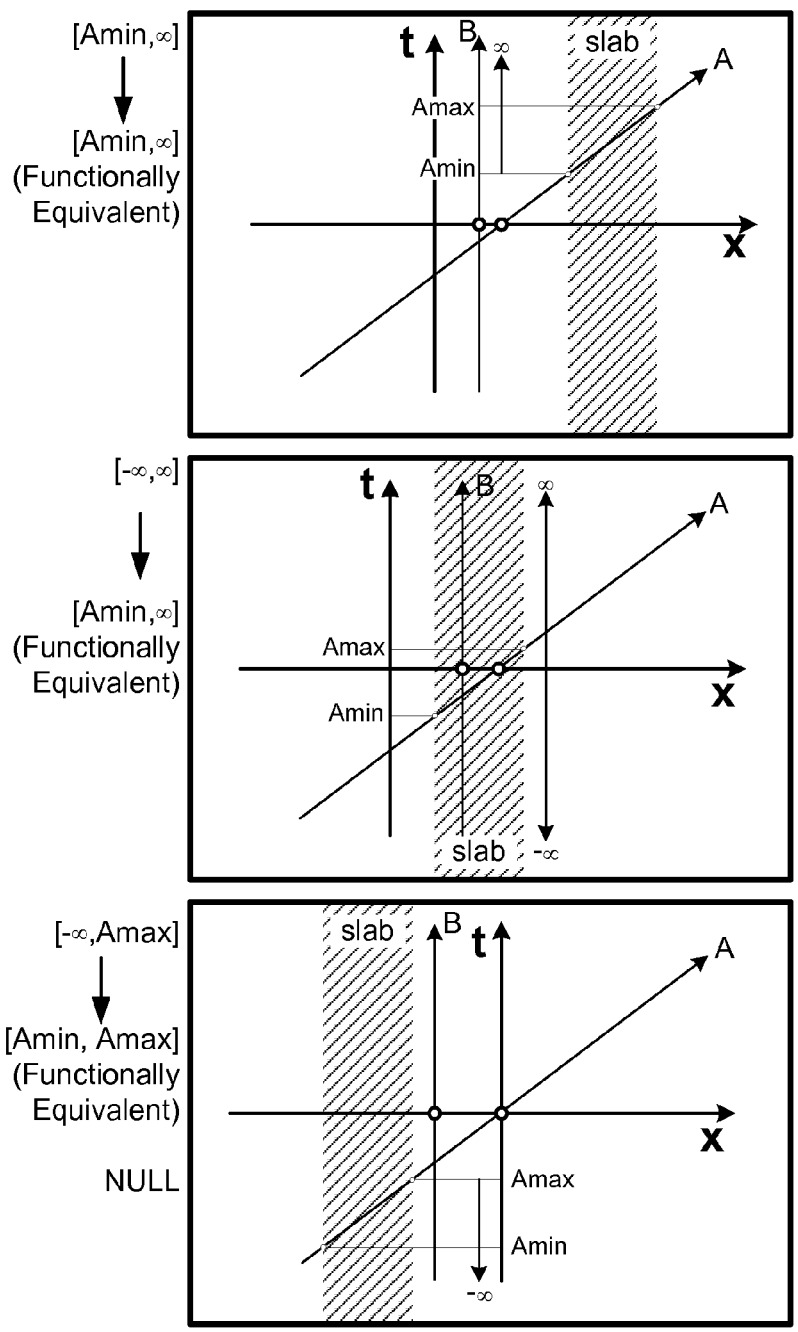
Figure 7C:
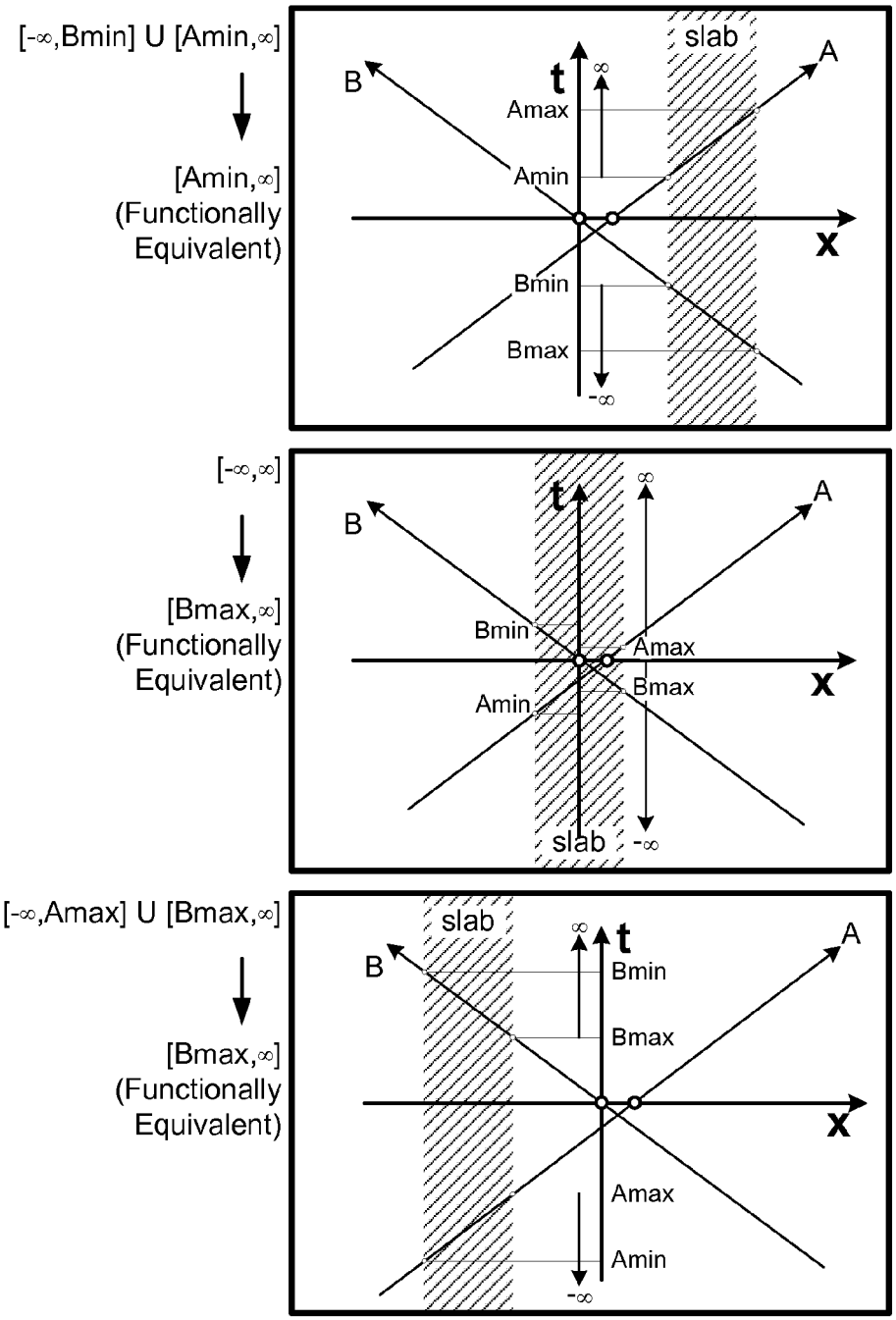
Figure 7D:
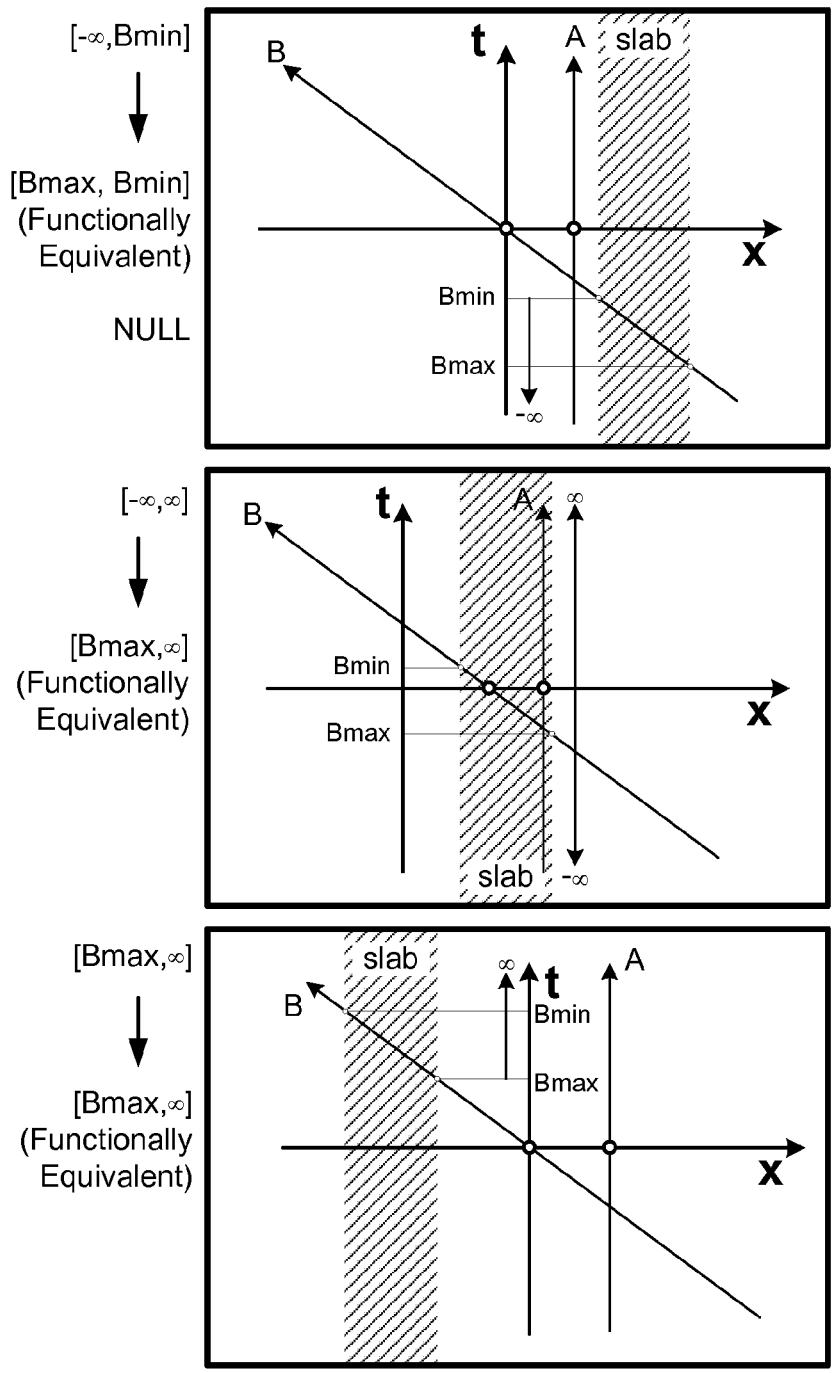
Figure 7E:
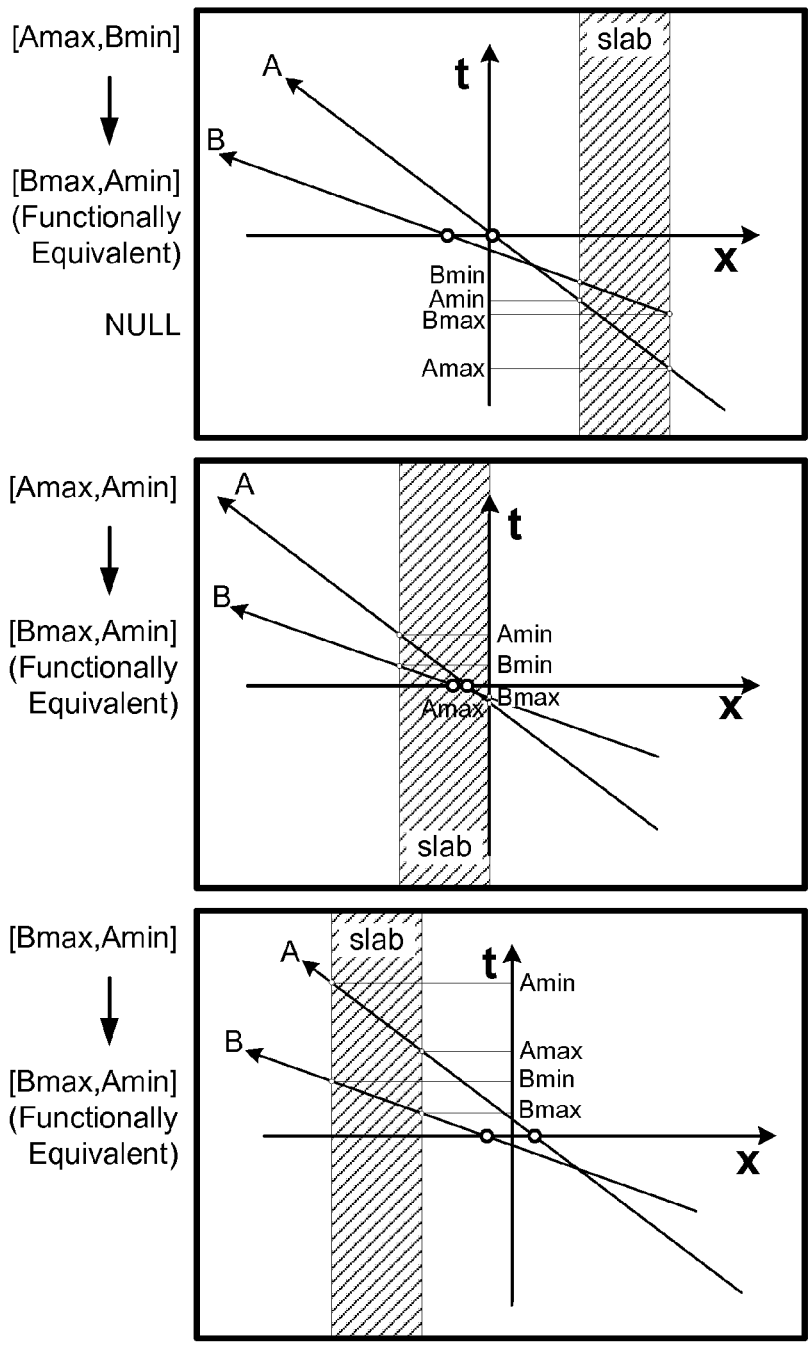
Figure 8:
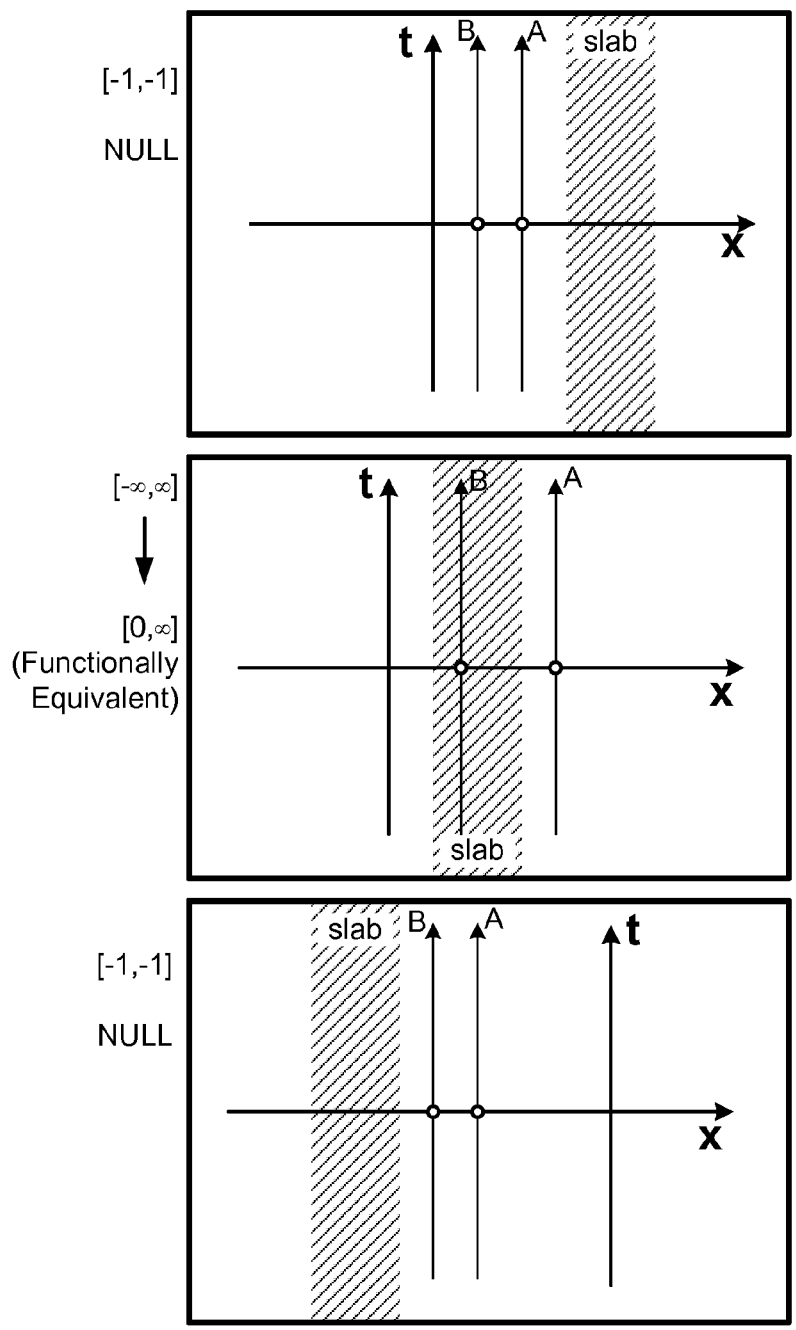

FIGS. 7A, 7B, 7D, 7E, and 8 each include an example of a NULL intersection. In examples that include a zero direction for a ray, the ray is marked as having an intersection point at infinity. FIGS. 7B, 7D, and 8 each include an example of a ray with a direction of zero.

Exemplary System

Figure 9:
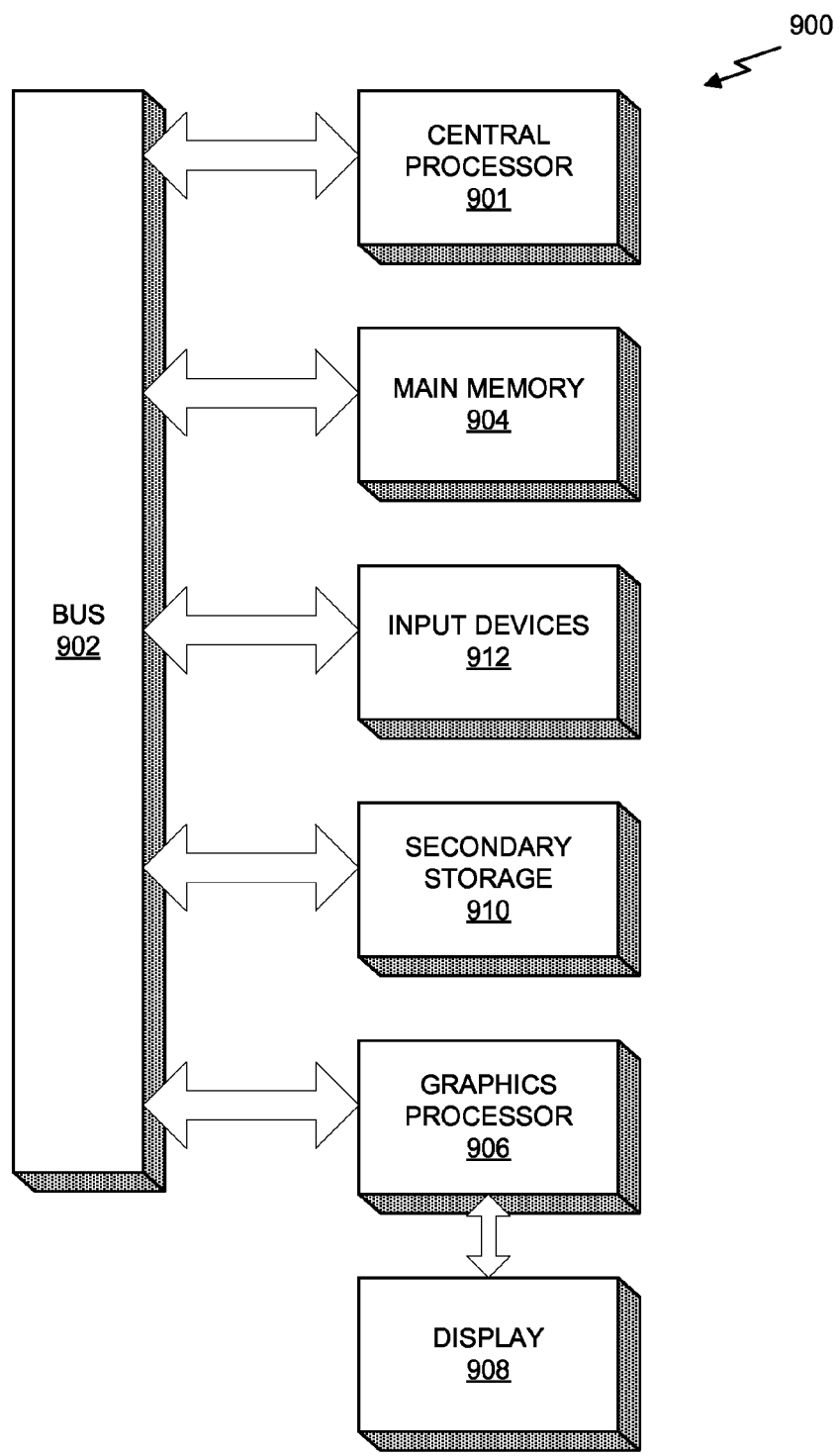
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of non-transitory computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a computer system, an intersection query comprising beam information associated with a query beam, the query beam comprising a plurality of query rays;
receiving, by the computer system, slab boundary information for a first dimension of a target bounding volume, the target bounding volume being a bounding box for a target object, and the slab boundary information for the first dimension of the target bounding volume indicating a position range of the target bounding volume along the first dimension;
calculating, by the computer system, intersection parameter values for the first dimension based on the beam information and the slab boundary information, the intersection parameter values calculated according to intersections of the query rays within the position range of the target bounding volume along the first dimension;
determining, by the computer system, a slab intersection case for the first dimension based on the beam information, the slab intersection case being a combination of at least two of the intersection parameter values calculated for the first dimension;
assigning, by the computer system, a parametric variable range for the first dimension based on the slab intersection case;
determining, by the system, whether the query beam intersects the target bounding volume using the parametric variable range for the first dimension;
responsive to determining that the query beam intersects the target bounding volume, performing, by the computer system, additional intersection analysis between each ray in the plurality of query rays and the target object; and
generating, by the computer system, an image of the target object from true intersections determined from the additional intersection analysis.

2. The method of claim 1, wherein the slab boundary information is specified within a three-dimensional space, and the first dimension corresponds to a coordinate axis of the three-dimensional space.

3. The method of claim 1, wherein the target bounding volume comprises an axis-aligned bounding box.

4. The method of claim 1, wherein the beam information comprises a first ray and a second ray specified within a three-dimensional space that includes the first dimension, the first ray associated with a first direction vector and a first origin, and the second ray associated with a second direction vector and a second origin.

5. The method of claim 4, wherein determining the slab intersection case comprises comparing the first direction vector with zero in the first dimension and comparing the second direction vector with zero in the first dimension.

6. The method of claim 4, wherein the slab boundary information comprises a slab minimum value and a slab maximum value for the first dimension.

7. The method of claim 4, wherein calculating intersection parameter values comprises calculating a first intersection parameter value by performing a first multiplication between a first inverse component of the first direction vector and a first distance, and calculating a second intersection parameter value by performing a second multiplication between a second inverse component of the second direction vector and a second distance.

8. The method of claim 1, wherein assigning a parametric range comprises assigning a minimum range value to a product of a first inverse component of a first direction vector of the query beam and a first distance between a first origin of the query beam and a slab minimum value associated with the slab boundary information, and assigning a maximum range value to a product of a second inverse component of a second direction vector of the query beam and a second distance between a second origin of the query beam and a slab maximum value associated with the slab boundary information.

9. The method of claim 1, wherein the intersection query comprises an additional parametric variable range and determining whether the query beam intersects the target bounding volume comprises:
assigning an overall parametric variable range bounded by a first value and a second value by:

selecting the first value as a maximum value from a first set of values comprising minimum values of the parametric variable ranges for the intersection query and at least the first dimension;

selecting the second value as a minimum value from a second set of values comprising maximum values of the parametric variable ranges for the intersection query and at least the first dimension; and determining that the query beam intersects the target bounding volume if the first value is less than or equal to the second value.

10. The method of claim 1, wherein the query beam is generated according to a dilation operator applied to a query ray.

11. The method of claim 1, wherein the plurality of query rays include a first query ray and a second query ray, and wherein the beam information includes a first query origin and a first query direction for the first query ray, and a second query origin and a second query direction for the second query ray.

12. The method of claim 11, wherein the bounding box for the target object is defined by bounding planes in each dimension of coordinate space occupied by the target object, and wherein the position range of the target bounding volume along the first dimension includes a minimum position of the target bounding volume along the first dimension and a maximum position of the target bounding volume along the first dimension.

13. The method of claim 12, wherein the intersection parameters values include:

first intersection parameter values calculated, respectively, according to an intersection between the minimum position of the target bounding volume and each of the first query ray and the second query ray, and second intersection parameter values calculated, respectively, according to an intersection between the maximum position of the target bounding volume and each of the first query ray and the second query ray.

14. The method of claim 13, wherein the slab intersection case is a combination of:

at least one value of the first intersection parameter values, and at least one value of the second intersection parameter values.

15. A system, comprising:

a memory configured to store a target bounding volume, the target bounding volume being a bounding box for a target object; and a processing unit coupled to the memory and configured to:

receive an intersection query comprising beam information associated with a query beam, the query beam comprising a plurality of query rays;

receive slab boundary information for a first dimension of the target bounding volume, the slab boundary information for the first dimension of the target bounding volume indicating a position range of the target bounding volume along the first dimension;

calculate intersection parameter values for the first dimension based on the beam information and the slab boundary information, the intersection parameter values calculated according to intersections of the query rays within the position range of the target bounding volume along the first dimension;

determine a slab intersection case for the first dimension based on the beam information, the slab intersection case being a combination of at least two of the intersection parameter values calculated for the first dimension;

assign a parametric variable range for the first dimension based on the slab intersection case;

determine whether the query beam intersects the target bounding volume using the parametric variable range for the first dimension;

responsive to determining that the query beam intersects the target bounding volume, perform additional intersection analysis between each ray in the plurality of query rays and the target object; and generate an image of the target object from true intersections determined from the additional intersection analysis.

16. A non-transitory computer-readable storage medium storing instructions that, when executed by a processor, cause the processor to perform steps comprising:

receiving an intersection query comprising beam information associated with a query beam, the query beam comprising a plurality of query rays;

receiving slab boundary information for a first dimension of a target bounding volume, the target bounding volume being a bounding box for a target object, and the slab boundary information for the first dimension of the target bounding volume indicating a position range of the target bounding volume along the first dimension;

calculating intersection parameter values for the first dimension based on the beam information and the slab boundary information, the intersection parameter values calculated according to intersections of the query rays within the position range of the target bounding volume along the first dimension;

determining a slab intersection case for the first dimension based on the beam information, the slab intersection case being a combination of at least two of the intersection parameter values calculated for the first dimension;

assigning a parametric variable range for the first dimension based on the slab intersection case;

determining whether the query beam intersects the target bounding volume using the parametric variable range for the first dimension;

responsive to determining that the query beam intersects the target bounding volume, performing additional intersection analysis between each ray in the plurality of query rays and the target object; and generating an image of the target object from true intersections determined from the additional intersection analysis.

* * * * *